United States Patent
Chen et al.

(10) Patent No.: US 12,445,274 B2
(45) Date of Patent: Oct. 14, 2025

(54) SYSTEMS AND METHODS TO DYNAMICALLY PROVISION MULTI-PARTY COMPUTATION (MPC) NODES

(71) Applicant: Nasdaq, Inc., New York, NY (US)

(72) Inventors: Jiayue Chen, Austin, TX (US);
Shankar Raju, Harrison, NJ (US);
Nick Ciubotariu, Austin, TX (US)

(73) Assignee: Nasdaq, Inc., New York, NY (US)

( * ) Notice: Subject to any disclaimer, the term of this patent is extended or adjusted under 35 U.S.C. 154(b) by 151 days.

(21) Appl. No.: 18/232,857

(22) Filed: Aug. 11, 2023

(65) Prior Publication Data

US 2024/0405976 A1 Dec. 5, 2024

Related U.S. Application Data

(60) Provisional application No. 63/470,235, filed on Jun. 1, 2023.

(51) Int. Cl.
*H04L 29/06* (2006.01)
*H04L 9/00* (2022.01)
(Continued)

(52) U.S. Cl.
CPC ............ *H04L 9/085* (2013.01); *H04L 9/0838* (2013.01); *H04L 9/3247* (2013.01); *H04L 9/50* (2022.05)

(58) Field of Classification Search
CPC ..... H04L 9/085; H04L 9/0838; H04L 9/3247; H04L 9/50; H04L 9/3239
See application file for complete search history.

(56) References Cited

U.S. PATENT DOCUMENTS

2020/0044863 A1* 2/2020 Yadlin ...................... G06F 9/54
2021/0391983 A1* 12/2021 Will ...................... H04L 9/3066
(Continued)

OTHER PUBLICATIONS

U.S. Appl. No. 18/232,858, filed Aug. 11, 2023, Raju et al.

*Primary Examiner* — Harunur Rashid
(74) *Attorney, Agent, or Firm* — NIXON & VANDERHYE P.C.

(57) ABSTRACT

A digital asset custody system dynamically provisions clusters of multi-party computation (MPC) nodes to securely create different private key shares for signing digital asset transactions and generate blockchain addresses for digital asset owners (AOs). Each cluster of MPC nodes is configured for an AO and to operate in a plurality of computing environments. Each of the computing environments is associated with a respective different signing party, and each computing environment includes a respective one of plural MPC node initializers and a respective one of plural MPC node operators. An MPC controller and MPC node initializers perform operations to generate first configuration information for each MPC node in a first MPC cluster of MPC nodes. Each MPC node operator, based on the first configuration information, deploys one of the MPC nodes in the first MPC cluster in the computing environment corresponding to where the MPC node operator operates, such that the one MPC node in the first MPC cluster is deployed into a different one of the plurality of computing environments as compared to the computing environments into which the other MPC nodes in the first MPC cluster are deployed. Analogous operations are performed to generate second configuration information to deploy a second MPC cluster, third configuration information to deploy a third MPC cluster, etc. as desired.

20 Claims, 9 Drawing Sheets

(51) Int. Cl.
 *H04L 9/08* (2006.01)
 *H04L 9/32* (2006.01)

(56) References Cited

U.S. PATENT DOCUMENTS

| | | | |
|---|---|---|---|
| 2022/0094555 A1* | 3/2022 | Roy | G06Q 20/065 |
| 2022/0255764 A1* | 8/2022 | Li | G06F 21/606 |
| 2022/0303122 A1* | 9/2022 | Be'Ery | H04L 9/50 |
| 2023/0177496 A1* | 6/2023 | Le Van Gong | G06Q 20/3829 |
| 2024/0249289 A1* | 7/2024 | Chiapuzio | H04L 9/008 |

\* cited by examiner

SYSTEMS AND METHODS TO DYNAMICALLY PROVISION MULTI-PARTY COMPUTATION (MPC) NODES

CROSS REFERENCE(S) TO RELATED APPLICATION(S)

This application claims priority from U.S. provisional patent application No. 63/470,235, filed on Jun. 1, 2023, the contents of which are incorporated herein by reference.

TECHNICAL OVERVIEW

The subject matter described herein relates to cryptography, information security, distributed systems, cloud computing, and blockchain technology.

BACKGROUND

Digital asset custody systems are used to secure information (such as private keys, private key shares, and/or other sensitive/valuable data) that provide access to digital assets (such as cryptocurrencies). Some of the technical challenges faced in the design and development of a digital asset custody system include: how to protect against the theft of sensitive/valuable data; how to configure and manage components/resources within the system; and how to scale the system when additional capacity is needed.

Accordingly, it will be appreciated that new and improved techniques, systems, and processes are continually sought after in these and other areas of technology to address these technical challenges.

SUMMARY

In example embodiments, a digital asset custody system includes one or more hardware processors communicating with one or more memories and configured to implement a multi-party computation (MPC) controller, a plurality of MPC node initializers, and a plurality of MPC node operators. Each of the MPC node initializers is configured to operate in a respective different computing environment of a plurality of computing environments, and each of the plurality of computing environments is associated with a respective different signing party of a plurality of signing parties. Each of the MPC node operators is configured to operate in a respective different computing environment of the plurality of computing environments, such that, such that each of the plurality of computing environments comprises one of the MPC node initializers and one of the MPC node operators. The MPC controller and MPC node initializers are configured to perform operations to generate first configuration information for each MPC node in a first MPC cluster of MPC nodes, where the number of MPC nodes in the first MPC cluster corresponds to the number of computing environments. Each of the MPC node operators is configured, based on the first configuration information, to deploy one of the MPC nodes in the first MPC cluster in the computing environment corresponding to where the MPC node operator is configured to operate, such that each MPC node in the first MPC cluster is deployed into a respective one of the plurality of computing environments. The MPC controller and MPC node initializers are further configured to perform operations to generate second configuration information for each MPC node in a second MPC cluster of MPC nodes, where the number of MPC nodes in the second MPC cluster corresponds to the number of computing environments. Each of the MPC node operators is further configured, based on the second configuration information, to deploy one of the MPC nodes in the second MPC cluster in the computing environment in which the MPC node operator is configured to operate, such that each MPC node of the second MPC cluster is deployed into a respective one of the plurality of computing environments.

In certain example embodiments, the MPC nodes in the first MPC cluster are configured with respective first node keys for authenticated communication with the other MPC nodes in the first MPC cluster, and the first MPC cluster is associated with a first asset owner. Each MPC node of the first MPC cluster is configured to perform operations that include: generating and storing a respective private key share for the first asset owner and signing a digital asset transaction for the first asset owner. The MPC nodes in the second MPC cluster are configured with respective second node keys for authenticated communication with the other MPC nodes in the second MPC cluster, and the second MPC cluster is associated with a second asset owner. Each MPC node of the second MPC cluster is configured to perform operations that include: generating and storing a respective private key share for the second asset owner and signing a digital asset transaction for the second asset owner in its respective computing environment using its respective private key share.

In certain example embodiments, the MPC controller is configured to perform operations that include communicating the first configuration information to a plurality of configuration approval portals, wherein each of the plurality of configuration approval portals is associated with a respective different computing environment of the plurality of computing environments and communicating the second configuration information to the plurality of configuration approval portals. Each of the MPC node operators is further configured to perform operations that include determining that the first configuration information for its respective MPC node of the first MPC cluster was approved via the associated configuration approval portal; in response to determining that the first configuration information was approved, deploying its respective MPC node in the first MPC cluster in its respective computing environment; determining that that the second configuration information for its respective MPC node in the second MPC cluster was approved via the configuration approval portal; and in response to determining that that the second configuration information was approved, deploying the one MPC node in the second MPC cluster in its respective computing environment.

In certain example embodiments, the one or more hardware processors and one or more memories are further configured to implement a plurality of MPC node secrets managers. Each of the MPC node secrets managers is configured to operate in a respective different computing environment of the plurality of computing environments, such that each of the plurality of computing environments comprises one of the plurality of MPC node secrets managers. The operations that the MPC controller and MPC node initializers are configured to perform to generate the configuration information for each MPC node of an MPC cluster of MPC nodes include, for each of the MPC nodes in the cluster: the MPC controller generating a request for a configuration for the MPC node; the MPC controller communicating the request for the configuration for the MPC node to a corresponding MPC node initializer of the plurality of node initializers; the MPC node initializer generating, in response to receiving the request, information that includes one or more secrets, where the one or more secrets include a node private key to use in secure communications with other components in the first MPC cluster, and one or more non-secrets, where the one or more non-secrets include a node public key to use in secure communications with other components in the first MPC cluster; the MPC node initializer providing to the MPC node secrets manager in its computing environment the one or more secrets from the generated information, wherein the MPC node secrets manager is configured to store the one or more secrets and return to the MPC node initializer one or more corresponding secret identifiers; the MPC node initializer generating MPC node initial configuration information that includes the one or more non-secrets and the one or more secret identifiers; and the MPC node initializer transmitting the MPC node initial configuration information to the MPC controller.

In certain example embodiments, the MPC controller is further configured to perform operations that include receiving the MPC node initial configuration information for each of the MPC nodes in the first MPC cluster, and for each of the MPC nodes in the first MPC cluster, generating deployment configuration information for that MPC node based on the MPC node initial configuration information for the other MPC nodes in the first MPC cluster.

In certain example embodiments, each MPC node operator in each computing environment is configured to perform operations that include receiving the deployment configuration information for the MPC node in its corresponding computing environment; providing to the secrets manager in its computing environment one or more of the secret identifiers from the deployment configuration information; receiving from the secrets manager in its computing environment the one or more secrets that correspond to the one or more secret identifiers; and deploying the MPC node in its computing environment, such that, after deployment, the MPC node is configured to operate based on (a) the one or more secrets received from the secrets manager and (b) non-secret information from the deployment configuration information for the MPC node.

In certain example embodiments, the one or more hardware processors and one or more memories are further configured to implement an MPC client associated with each MPC cluster. The MPC controller is configured to perform operations to generate MPC client initial configuration information for the MPC client, the MPC client initial configuration information including: one or more secret identifiers, wherein the one or more secret identifiers include an MPC client private key identifier that corresponds to an MPC client private key for the MPC client to use in secure communications with other components in the first MPC cluster; and one or more non-secrets, wherein the one or more non-secrets include an MPC client public key for the MPC to use in secure communications with other components in the first MPC cluster. The MPC controller is configured to generate deployment configuration information for the MPC client based on the MPC client initial configuration information.

In certain example embodiments, the one or more hardware processors and one or more memories are further configured to implement an MPC client secrets manager. The operations that the MPC controller is configured to perform to generate MPC client initial configuration information for the MPC client include: providing the MPC client private key to the MPC client secrets manager, wherein the MPC client secrets manager is configured to store the MPC client private key and return a corresponding MPC client private key identifier; and receiving the MPC client private key identifier from the MPC client secrets manager.

In certain example embodiments, the MPC controller is further configured to perform operations that include: communicating the deployment configuration information for the MPC client to a configuration approval portal; determining that the deployment configuration information for the MPC client was approved via the configuration approval portal; and in response to determining that the deployment configuration information for the MPC client was approved, deploying the MPC client.

In certain example embodiments, the MPC controller is further configured to perform operations that include after the determining that the deployment configuration information for the MPC client was approved via the configuration approval portal: providing to the MPC client secrets manager the MPC client private key identifier; and receiving, from the MPC client secrets manager in response to the MPC client private key identifier, the MPC client private key. The deploying of the MPC client by the MPC controller includes using the MPC client private key and one or more non-secrets from the deployment configuration information for the MPC client.

In certain example embodiments, the MPC controller is configured to generate configuration information for the MPC client that includes: an MPC node public key for each MPC node in the first MPC cluster; and an address for each MPC node in the first MPC cluster. The MPC client is configured to securely communicate with each MPC node in the first MPC cluster using the MPC node public key and the address for each MPC node in the first MPC cluster.

In certain example embodiments, the one or more hardware processors and one or more memories are further configured to implement an MPC client associated with each MPC cluster. Each MPC client is configured to communicate with each MPC node in its respective MPC cluster, using one or more MPC protocols, to generate a public blockchain address for the corresponding asset owner. Each MPC client is further configured to send the public blockchain address to a computing device associated with its corresponding asset owner.

In certain example embodiments, the one or more hardware processors and one or more memories are further configured to implement a blockchain service. The MPC client is configured to send a blockchain transaction to each MPC node in its respective MPC cluster for partial signature. Each MPC node in the first MPC cluster is configured to generate a partial signature for the blockchain transaction using a private key share, and to send the partial signature to its respective MPC client. The MPC client is configured to generate a full signature using the partial signatures received from each MPC node in its respective MPC cluster, add the full signature to the blockchain transaction to generate a fully-signed blockchain transaction, and provide the fully-signed blockchain transaction to the blockchain service. The blockchain service is configured to transmit the full-signed blockchain service to a blockchain network.

Example embodiments include a method that comprises, in a computing system that includes one or more hardware processors and one or more memories, wherein the one or more memories are configured to store instructions for a multi-party computation (MPC) controller, a plurality of MPC node initializers, and a plurality of MPC node operators: operating each of the MPC node initializers in a respective different computing environment of a plurality of computing environments, where each of the plurality of computing environments is associated with a respective different signing party of a plurality of signing parties; operating each of the MPC node operators in a respective different computing environment of the plurality of computing environments, such that each of the plurality of computing environments comprises one of the MPC node initializers and one of the MPC node operators; the MPC controller and MPC node initializers generating first configuration information for each MPC node of a first MPC cluster of MPC nodes, where the number of MPC nodes in the first MPC cluster corresponds to the number of computing environments; each of the MPC node operators, based on the first configuration information, deploying one of the MPC nodes in the first MPC cluster in its respective computing environment, such that the one MPC node in the first MPC cluster is deployed into a respective one of the plurality of computing environments; the MPC controller and MPC node initializers generating second configuration information for each MPC node of a second MPC cluster of MPC nodes, where the number of MPC nodes in the second MPC cluster corresponds to the number of computing environments; and each of the MPC node operators, based on the second configuration information, deploying one of the MPC nodes of the second MPC cluster in its respective computing environment in which the MPC node operator is configured to operate, such that the one MPC node of the second MPC cluster is deployed into a respective one of the plurality of computing environments.

Example embodiments include a non-transitory, computer-readable storage medium having instructions stored thereon for a multi-party computation (MPC) controller, a plurality of MPC node initializers, and a plurality of MPC node operators, and which when executed by one or more hardware processors cause the one or more processors to perform operations comprising: operating each of the MPC node initializers in a respective different computing environment of a plurality of computing environments, where each of the plurality of computing environments is associated with a respective different signing party of a plurality of signing parties; operating each of the MPC node operators in a respective different computing environment of the plurality of computing environments, such that each of the plurality of computing environments comprises one of the MPC node initializers and one of the MPC node operators; the MPC controller and MPC node initializers generating first configuration information for each MPC node in a first MPC cluster of MPC nodes, wherein the number of MPC nodes in the first MPC cluster corresponds to the number of computing environments; each of the MPC node operators, based on the first configuration information, deploying one of the MPC nodes of the first MPC cluster in its respective computing environment, such that each MPC node of the first MPC cluster is deployed into a respective one of the plurality of computing environments; the MPC controller and MPC node initializers generating second configuration information for each MPC node in a second MPC cluster of MPC nodes, where the number of MPC nodes in the second MPC cluster corresponds to the number of computing environments; and each of the MPC node operators, based on the second configuration information, deploying one of the MPC nodes of the second MPC cluster in its respective computing environment, such that each MPC node of the second MPC cluster is deployed into a respective one of the plurality of computing environments.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
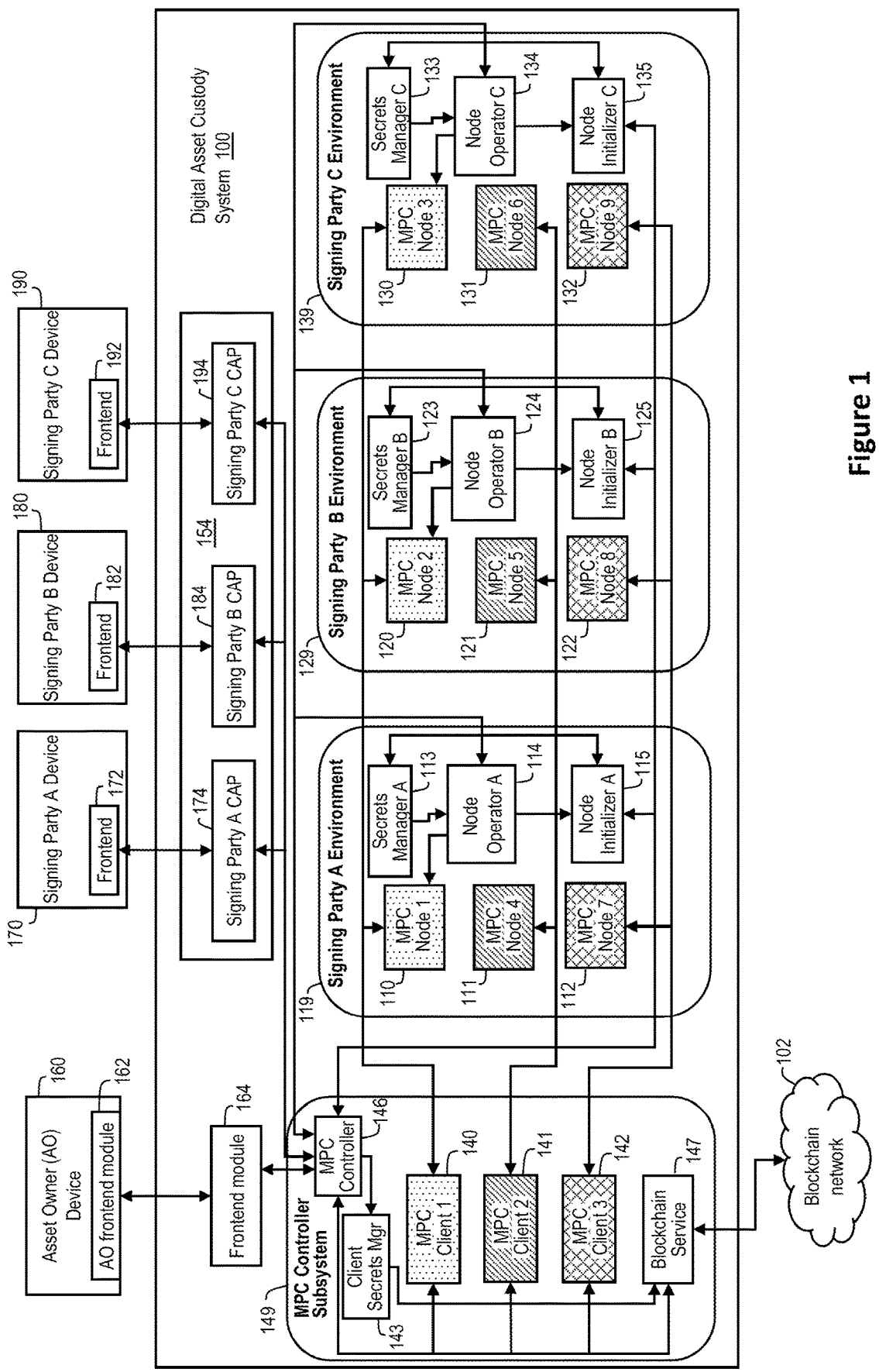
FIG. 1 is an example digital asset custody system diagram according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely to orient the reader as to the general subject matter of each section; as will be seen below, the description of many features spans multiple sections, and headings should not be read as affecting the meaning of the description included in any section.

1. Information Regarding Blockchain, Multiparty Computation (MPC), and Cloud Computing Embodiments described herein relate to blockchain technology, cryptography, multi-party computation (MPC), and cloud computing. Information related to some terms and concepts in these technical fields will now be provided.

Blockchain technology (which may also be referred to as "distributed ledger technology," or simply "blockchain") is a relatively new type of database technology. An example implementation and corresponding blockchain techniques are described in a 2008 article by Satoshi Nakamoto titled "Bitcoin: A Peer-to-Peer Electronic Cash System," the entire contents of which are hereby incorporated by reference. Blockchains have many uses such as, but not limited to, recording exchanges of goods (virtual or physical), securely recording data, cryptocurrency (such as Bitcoin), implementing smart contracts that include functionality to be executed when certain conditions are met and recorded on a blockchain, etc.

A blockchain is a distributed database system (sometimes called a distributed ledger) that records transactions. A transaction (which may also be called a "blockchain transaction" or a "distributed ledger transaction") is a data structure that contains different fields. In many systems, this data structure can express, inter alia, a transfer of some amount of cryptocurrency from a source address (also referred to as a "public source address") to a destination address (also referred to as a "public destination address," or similar).

In many blockchain systems, multiple transactions are collected and formed into a block, and each successive block of transactions cryptographically depends on a prior block. This architecture creates a chain of blocks—a blockchain. The cryptographic dependency can be generated by including a fingerprint (such as a cryptographic hash) into a block that is based on data from a prior block. Each block then ends up being cryptographically linked to a prior block such that modification of a prior block will be mathematically evident. Transactions can be secured and authenticated within a blockchain system (such as Bitcoin and other systems) by using digital signatures (details below).

A "wallet" (or "digital wallet," or similar) may perform functionality that allows a user to interface with a blockchain system; this functionality may include storing private keys (and/or related information, such as recovery seeds), managing digital assets, communicating data to/from a blockchain system, and/or generating transactions (including the signing of the transactions) for recordation in a blockchain system. As used herein, the term "digital asset" refers to an asset that is issued and/or transferred using distributed ledger technology, blockchain technology, and/or similar technology; examples of digital assets include cryptocurrencies and non-fungible tokens (NFTs). Depending on the context, the term "wallet" may refer to a data structure, a physical device, an application (or other software component), or a service. As one example, "wallet" may refer to an application that a user may use on their mobile device to create, e.g., a public Ethereum address for the user (along with the associated private key) and to receive and send Ethereum. As another example, "wallet" may refer to a hardware device that a user may plug into the user's computer when the user needs it, and which is configured to securely store information (such as private keys and/or recovery seeds) for the user. As another example, "wallet" may refer to a component in a larger system that performs functionality such as generating public addresses (also referred to as "blockchain public addresses" or similar) for use on a blockchain system and interfacing with that blockchain system.

In many implementations, a wallet (whether it is a data structure, a physical device, an application, a service, or some other implementation) creates a private key for the user of the wallet. From this private key, the wallet derives a public blockchain address. When the user wants the wallet to "hold" some digital assets, the user directs some digital asset(s) to be sent to the public blockchain address in one or more blockchain transactions. Subsequently, to transfer assets away from the public blockchain address, one more blockchain transactions that specify the outbound transfer must be processed by the blockchain network; for such blockchain transactions to be valid (and actually processed by the network), they must be signed with a digital signature that is based on the private key (details below); thus, control of the private key amounts to control of the assets at the associated public address.

One type of wallet that has been developed is the hierarchical deterministic wallet ("HD wallet"). With an HD wallet, an initial (or "parent" or "master" or "root") private key is generated. Then, "child" private keys can be derived from the initial/parent private key. For each child private key, a public address can be derived; and the child private key associated with the public address can be used to sign transactions for that public address. Further, additional private keys ("grandchild keys") can be derived from each child private key, and so on, thereby creating a tree structure. This derivation is repeatable; i.e., the derived private keys and tree structure thereof can be re-created/re-derived as long as the initial private key is available. HD wallets provide for, among other benefits, the flexible use of multiple public addresses that are associated (via derivation) with a single initial private key.

For clarity, while many wallets involve the storage of private keys, in some systems private key shares rather than private keys are used for the signing of transactions (details provided below), in which case a "wallet" might provide some of the functionality noted above but not involve the storage of private keys.

A digital signature involves a set of algorithms and encryption protocols that can be used to verify the authenticity or ownership of a digital message (such a message involving a transaction in a blockchain system). A digital signature in some implementations (such as Bitcoin) is generated by taking a hash of the transaction (i.e., the transaction data structure) and then encrypting the resulting message hash with a private key. This process generates an encrypted message hash, also known as a digital signature. In many types of blockchain implementations (such as Bitcoin), a transaction must have a valid signature (e.g., must have the correct mathematical relationship to the public source address for the assets being transferred) for the transaction to be considered valid and included into the blockchain.

As noted above, in some approaches to signing blockchain transactions, a private key is used to generate the digital signature. Another approach involves the use of multi-party computation (MPC), threshold cryptography, and the use of "key shares," instead of a private key, to sign a transaction. ("Key shares" may also be referred to in this document as "private key shares," "cryptographic key shares," or similar.) In MPC, a function can be performed involving multiple parties, where no individual party can see the data that other parties input into the function. Some approaches to using MPC to sign a transaction operate as follows: a number of different parties are involved, with each party separately generating their own respective key share (with the generated respective key shares having a mathematical relationship to the same private key); each party signs the transaction with their respective key share, thereby generating a partial signature; and then the partial signatures are used to generate a full signature (which in some instances may also be referred to as a "threshold signature," to indicate that it is based on partial signatures from a required threshold number of key shares/parties). This approach has the same desired result as signing a transaction with a private key, in that a valid signature is generated/arrived at; however, this approach does not require that a full private key be held or be used in the generation of the signature. Per this approach, for an attacker to sign a transaction, there is no single private key that is available, that the attacker could attempt to obtain; instead, the attacker would need to obtain all of the key shares required to generate a threshold signature; and even if the attacker is able to obtain some of the key shares, if there is even one key share that the attacker cannot obtain then the attacker cannot produce a valid threshold signature.

Cloud computing is a technical field that includes a number of aspects; two important virtualization technologies used in cloud computing are virtual machines (VMs) and containers.

A VM is software that provides the functionality of a physical (hardware) computing machine; a VM runs on a physical host computing machine that includes one or more hardware processors in communication with one or more memories that store emulation program code to implement the VM. Each VM typically has its own operating system, and functions separately from other VMs, even if they run on the same physical host computing machine. VMs can run on servers, desktop computers, or embedded platforms which may be proximate to the operation or remote to the operation, such as in a cloud-based service or environment. Multiple VMs can share resources from a physical host computing machine, including CPU cycles, network bandwidth and memory.

A container is a self-contained package of software; in many instances, a container will include the code for a particular application along with the dependencies for that application. A container host is a software system that can run containers. Container hosts can run on many different machines (i.e., hardware computers and VMs); a container can be built using a standardized format, and deployed onto and run by a container host, without regard to the specifics of the machine on which the container host might be running; and so, containers are said to be "portable." When multiple containers run on the same container host, they do so in a manner that is isolated from each other; e.g., they are run in separate processes. It is not required that VMs and containers be used together, though they can be. As described above, a container host can run in a VM; though a container host can also run directly on the operating system of a hardware computer.

2. Overview

Figure 2:
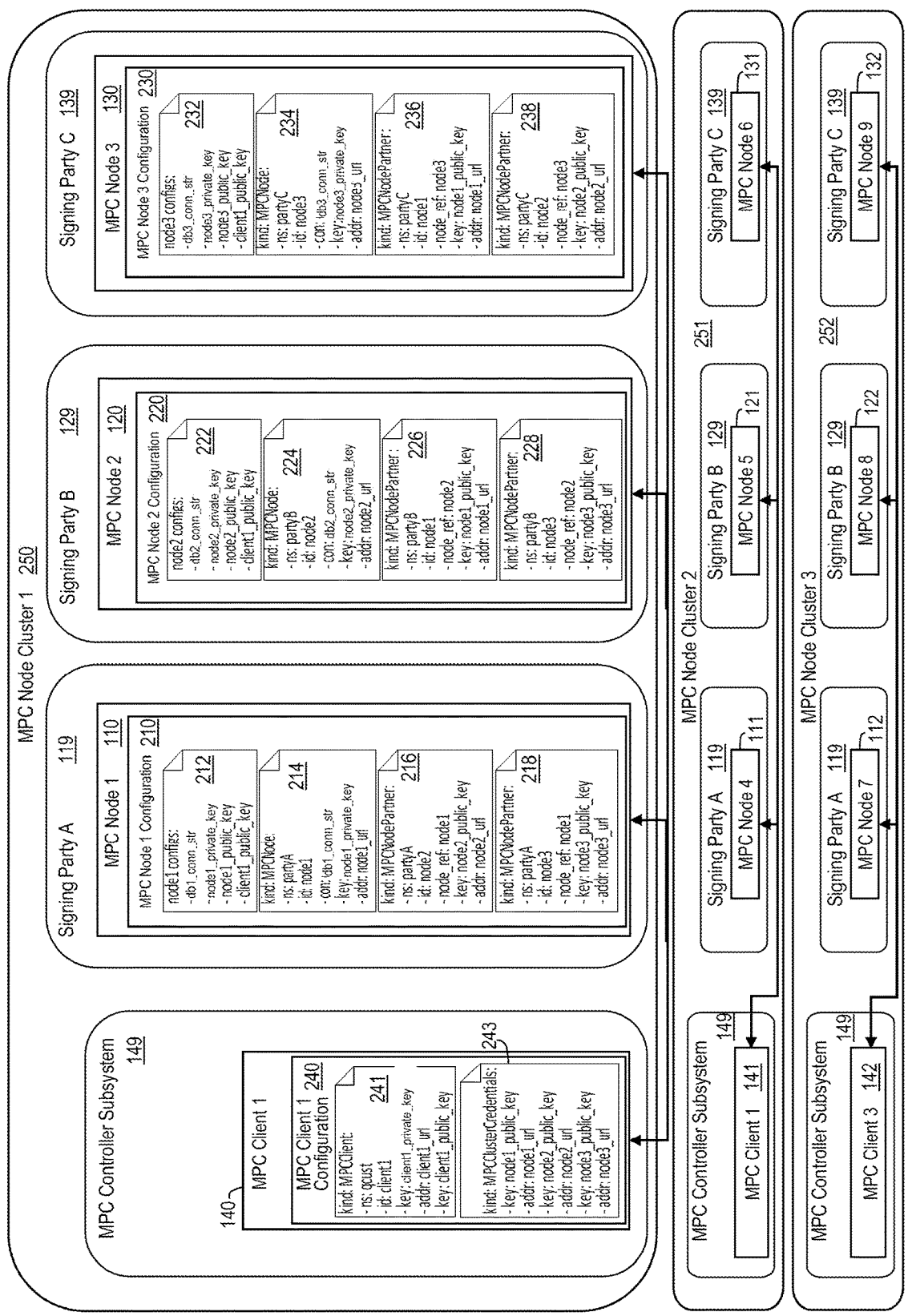
FIG. 2 is a diagram that shows details regarding components that may be deployed in a digital asset custody system according to certain example embodiments.
Figure 3A:
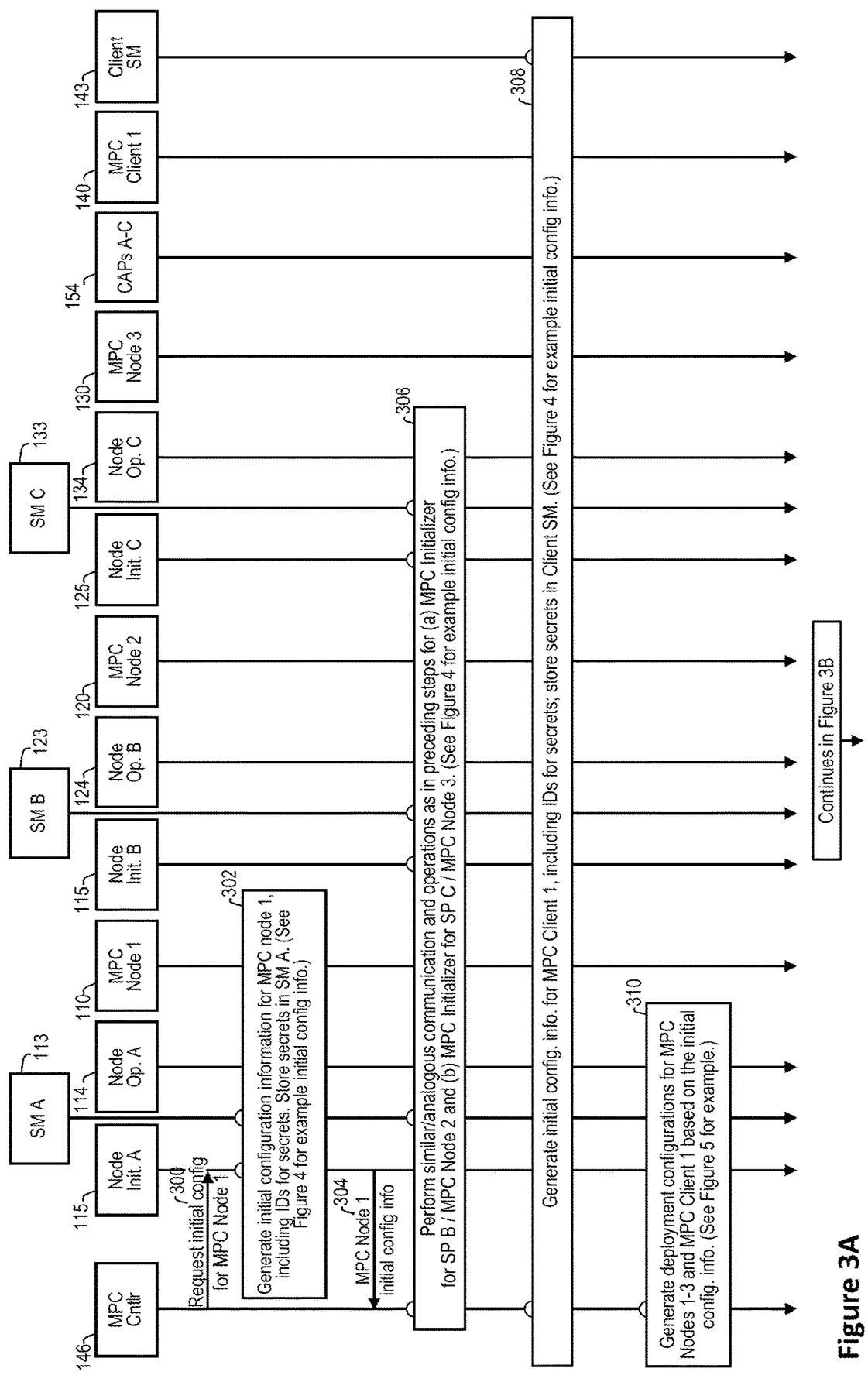
FIG. 3A and FIG. 3B are a sequence diagram that shows a cluster deployment process according to some embodiments, wherein a cluster of multi-party computation (MPC) nodes in a digital asset custody system are deployed.
Figure 3B:
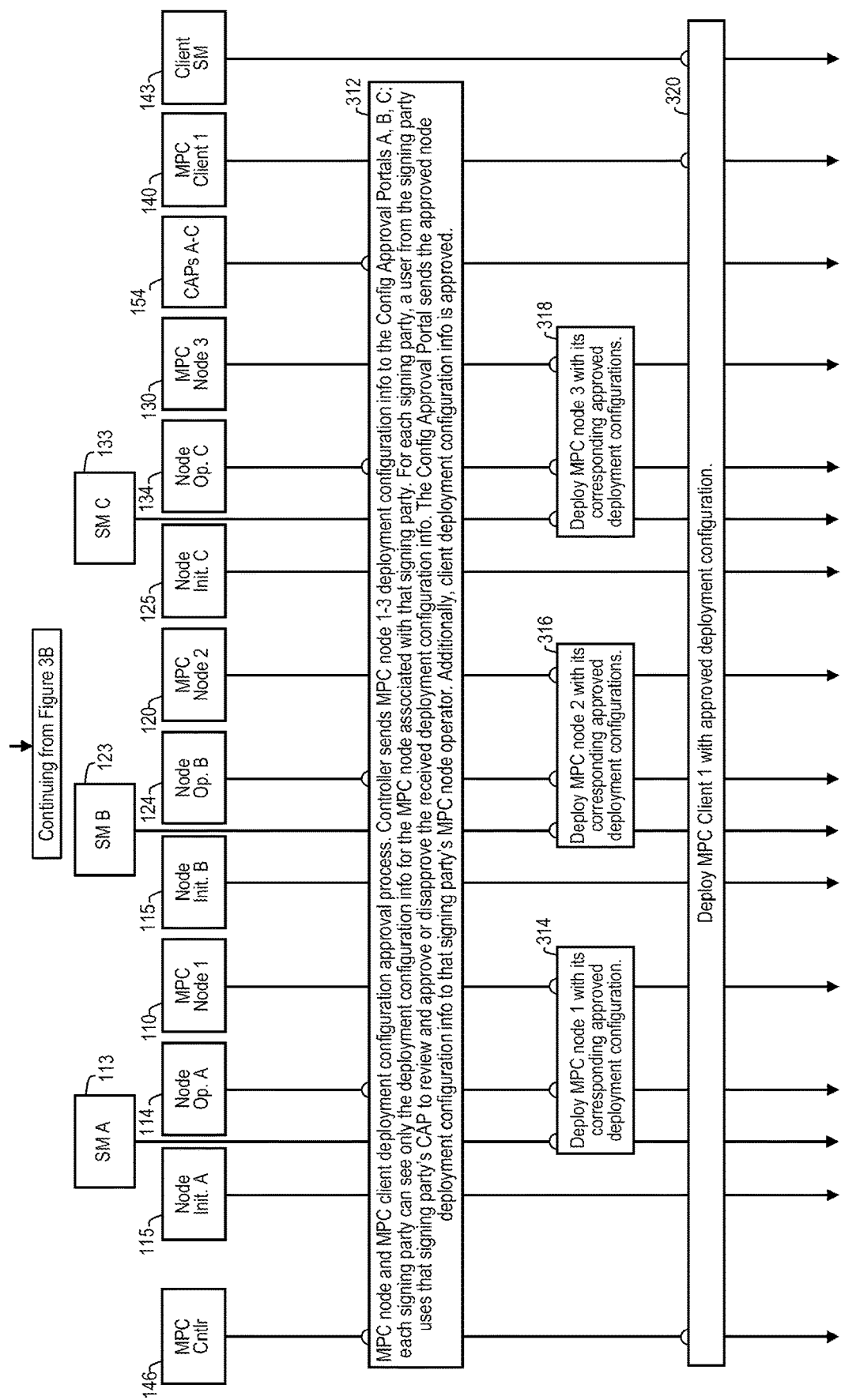
Figure 4:
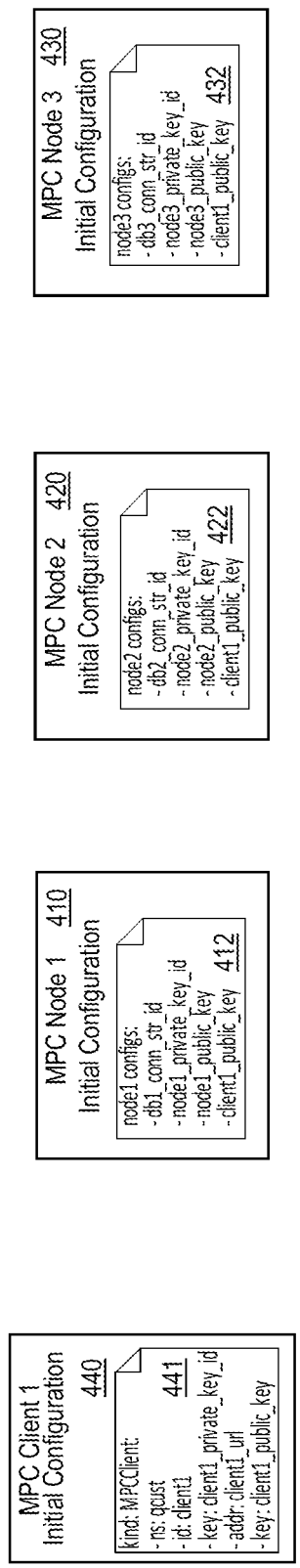
FIG. 4 and FIG. 5 shows example configuration information that may be used in connection with a cluster deployment process according to certain example embodiments.
Figure 5:
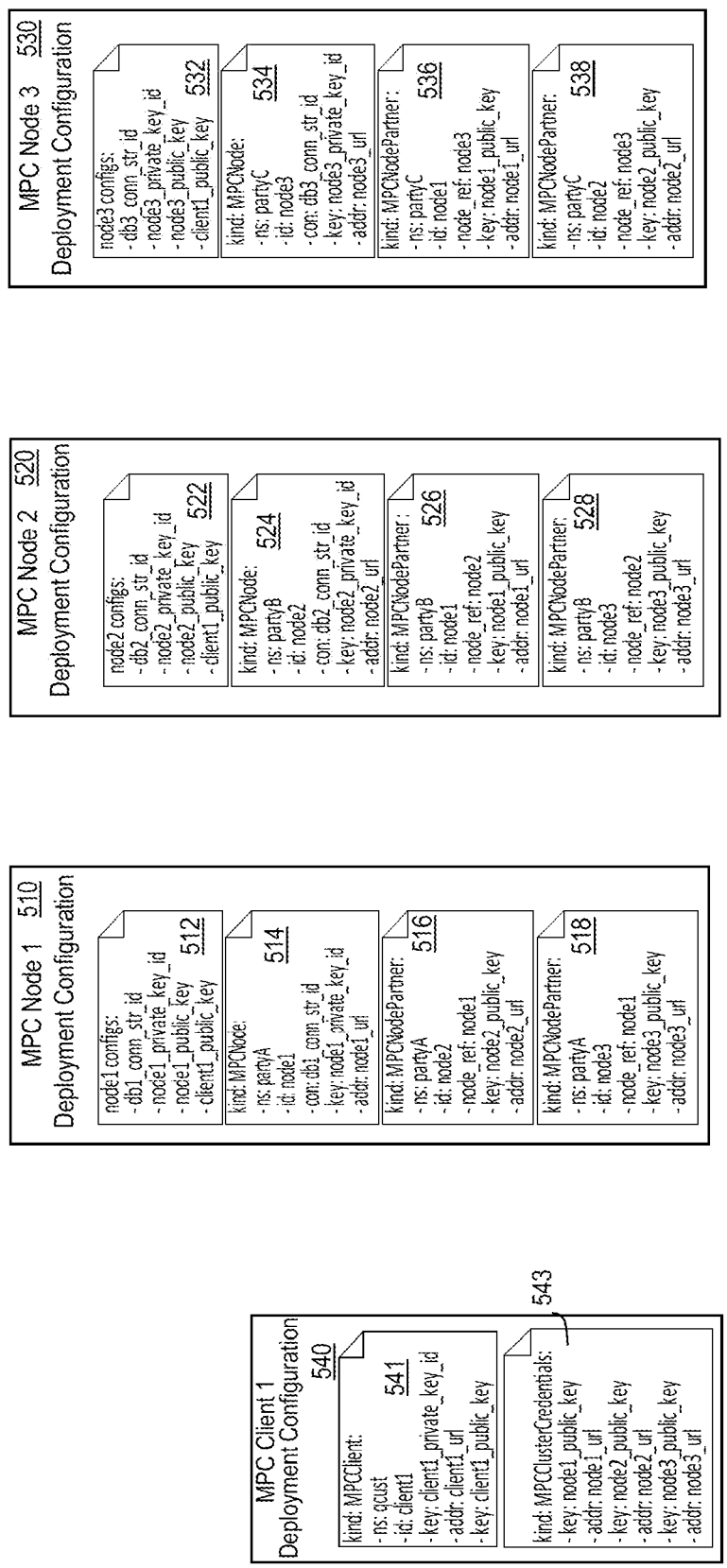
Figure 6:
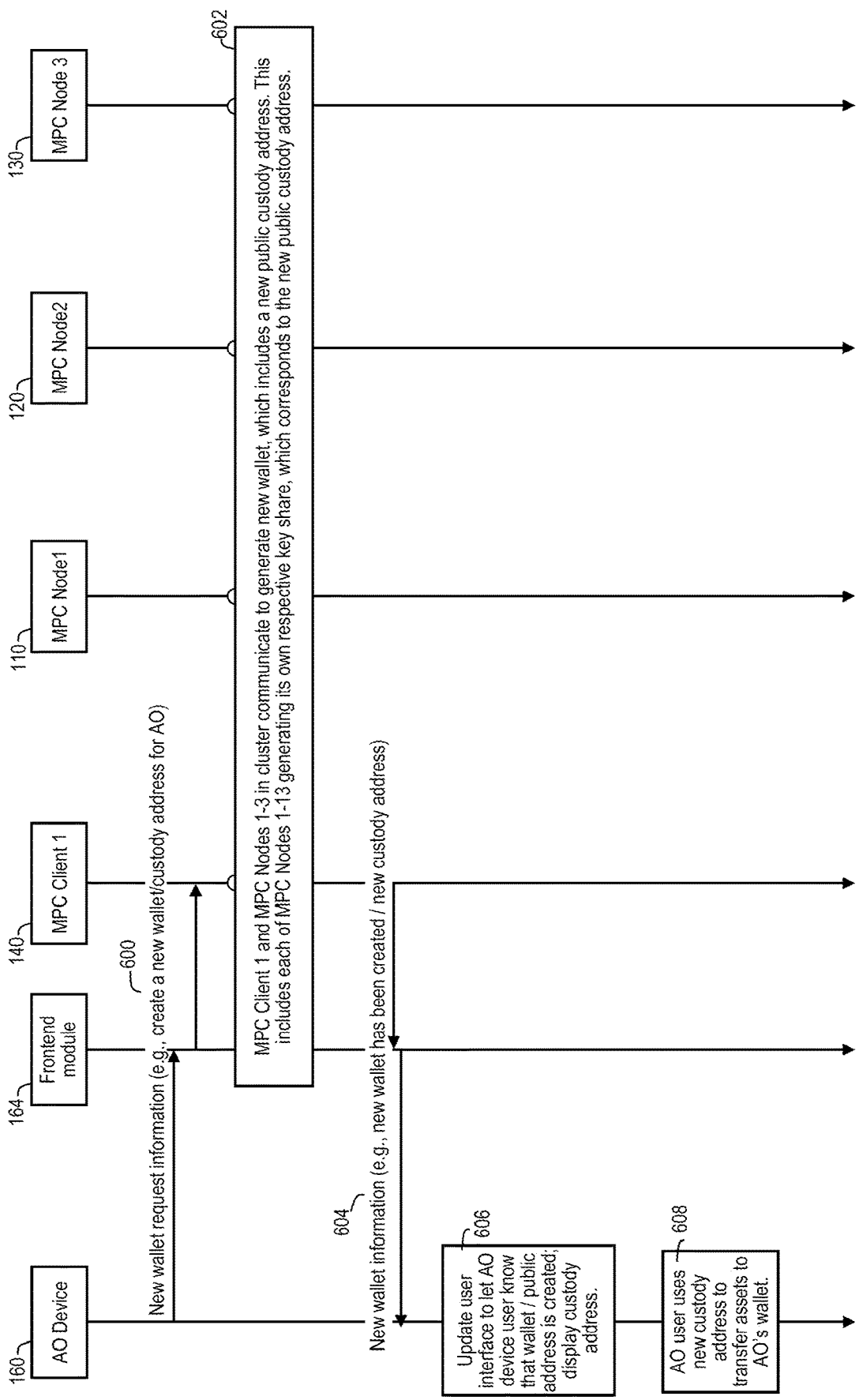
FIG. 6 is a sequence diagram showing a wallet creation process according to some embodiments, wherein a new wallet and custody address for an asset owner (AO) are created.
Figure 7:
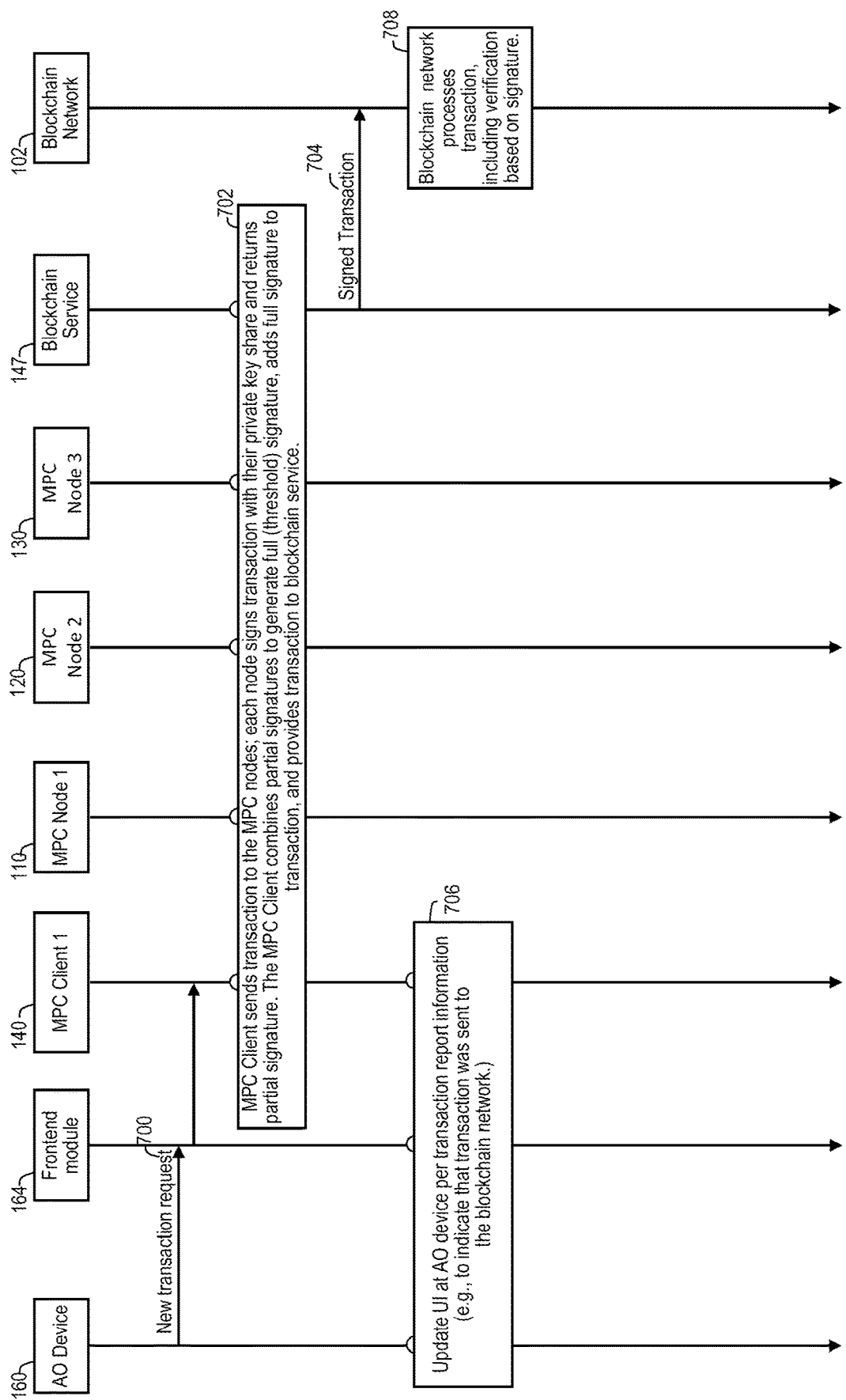
FIG. 7 is a sequence diagram showing a transaction generation process according to some embodiments, wherein MPC nodes in an MPC cluster sign a digital asset transaction.
Figure 8:
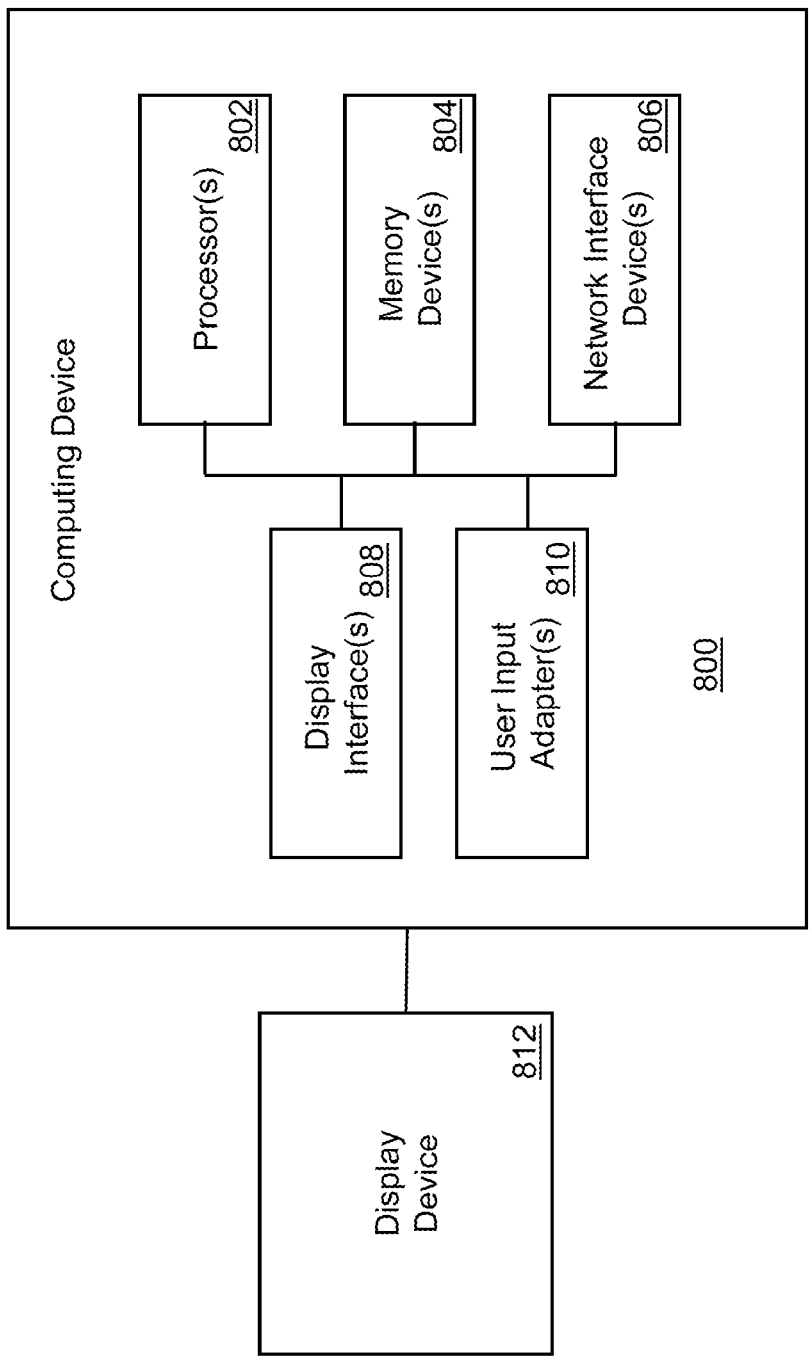
FIG. 8 shows an example computing system that may be used in some embodiments to implement features described herein.

Described herein is a digital asset custody system that, in some embodiments, securely stores information (such as private key shares and/or other secrets) and uses that information to custody/control access to digital assets such as cryptocurrencies. In various embodiments, the digital asset custody system (which is the digital asset custody system 100 shown in FIG. 1) may implement functionality that includes: (1) a "cluster deployment process," via which a new "cluster" of components (including MPC nodes) may be deployed in the system 100, to custody digital assets for an asset owner (AO); (2) a "wallet creation process," via which the deployed cluster (in conjunction with other components in the system 100) generates a new wallet and public custody address for the AO; and (3) a "transaction generation process," via which the deployed cluster (in conjunction with other components in the system 100) generates, signs, and transmits a digital asset transaction on behalf of the AO. FIGS. 3A-3B shows how the cluster deployment process is implemented in some embodiments, with FIG. 4 and FIG. 5 showing example configuration data that may be used during the cluster deployment process; FIG. 6 shows how the wallet creation process is implemented in some embodiments; and FIG. 7 shows how the transaction generation process is implemented in some embodiments. In addition to the above Figures, FIG. 2 shows an example of configuration information that a deployed cluster may use to operate within the digital asset custody system 100, and FIG. 8 shows an example computing system that may be used to implement the digital asset custody system 100.

In a given embodiment, the digital asset custody system 100 may implement many variations on the above-noted three processes; but for ease of description, the "cluster deployment process," "wallet creation process," and "transaction generation process" will be noted in many places in this document in the singular.

As will be described in further detail below, the described digital asset custody system and features thereof (including the above-noted three processes) relate to improvements in information security and in the efficiency, scalability, and flexibility of distributed systems and cloud computing systems.

3. Description of FIG. 1—Digital Asset Custody System

In many places in this document, including the description of FIG. 1, computer-implemented function blocks, functions, actions, and/or operations may be implemented using software nodes or module(s). The terms "node" and "module" as used in this document each refers to a computing resource that uses software to execute a computer program or code and/or deploy a computer application. In some embodiments, each "node" as described herein may be implemented on its own virtual machine. As another example, a node may also be implemented by a computing process, a computing thread, a module of software code, or a container. In some embodiments, a node may be implemented as a container that runs on a virtual machine.

It should be understood that function blocks, operations, signaling, communication of data, and/or other actions performed by node(s) or software module(s) as described in this document are actually implemented by underlying hardware (such as at least one hardware processor and at least one memory device) according to program instructions specified by the software node(s) or module(s); details of an example computer system with at least one hardware processor and at least one memory device are provided in the description of FIG. 8. In addition, the illustrated and/or described nodes, functions, and actions may also be implemented using various configurations of hardware (such as ASICs, PLAs, discrete logic circuits, etc.) alone or in combination with programmed computer(s).

FIG. 1 shows an example digital asset custody system 100 according to certain example embodiments. The digital asset custody system 100 may be implemented using "clusters" of components, wherein each cluster includes MPC nodes (described below) and an MPC client (described below). (A "cluster" may also be referred to as an "MPC cluster," "MPC node cluster," or similar.) In a given cluster, the MPC nodes may each separately generate a private key share during the wallet creation process; the key shares may then be used to sign a digital asset transaction (using MPC protocols), in connection with the transaction generation process. Per this approach, the digital asset custody system 100 does not store full private keys themselves, thereby safeguarding against the theft of digital assets.

The digital asset custody system 100 may custody digital assets on behalf of "asset owners (AOs)." An AO may be an entity (such as an organization, a corporation (or other kind of legal entity), or a natural person) that owns or otherwise controls some digital assets. In various embodiments, the digital asset custody system 100 may be configured to custody digital assets, such as cryptocurrencies (e.g., Bitcoin, Ethereum), non-fungible tokens (NFTs), fungible tokens, and/or other types of digital assets that may be represented in various blockchain and/or distributed ledger systems. In various embodiments, the digital asset custody system 100 may be configured to custody a single type of digital asset or multiple types of digital assets, in various combinations. As one example, the digital asset custody system 100 may be configured to custody Bitcoin and Ethereum.

In a given cluster, each of the MPC nodes may operate in a different signing party computing environment; each signing party computing environment may be, e.g., a private network or other kind of computing infrastructure, and each may be associated with, and/or operated by or on behalf of, a different "signing party." A signing party may be an entity such as an organization, a corporation (or other kind of legal entity), or a natural person. FIG. 1 shows an example with three different signing party computing environments: Signing Party A Computing Environment 119 (which will also be referred to as "SP-A Environment 119"), Signing Party B Computing Environment 129 ("SP-B Environment 129"), and Signing Party C Computing Environment 139 ("SP-C Environment 139"). In some embodiments, all three signing parties may be subdivisions (or distinct units, or distinct teams) within the same corporation. Consistent with the foregoing, a corporation's technology operations team might be Signing Party A, the corporation's information security team might be Signing Party B, and the corporation's customer support team might be Signing Party C. Each signing party may be responsible for managing its own independent computing environment; and in some embodiments each signing party has no access to the other two signing party environments. In some embodiments, each MPC node in the digital asset custody system 100 is configured in its signing party environment as a container that operates within a virtual machine.

In certain example embodiments, the digital asset custody system 100 may be implemented, or portions of it may be implemented, in a cloud computing environment, such an environment provided by Amazon Web Services (AWS), Microsoft Azure, Google Cloud Platform, IBM Cloud, or Oracle Cloud Infrastructure, etc., and may be implemented across one or more physical computer systems (such as, for example, a computer system as shown in FIG. 8). In some embodiments that involve using a cloud computing environment, each signing party may have its own account with a given cloud provider, and each signing party environment may be associated with each MPC signing party's respective separate account; e.g., the three signing party computing environments 119, 129, 139 may each be associated with a respective different account at a cloud provider, with each of the environments 119, 129, 139 isolated from the other environments 119, 129, 139 within the cloud provider's systems. Alternatively or additionally, in some embodiments the MPC signing parties' accounts may be distributed across multiple cloud providers and their corresponding systems. Alternatively or additionally, in some example embodiments, the signing party's computing environments may be implemented across different data centers.

As noted above, MPC nodes in a cluster may be configured to operate in a different signing party environment. Additionally, according to some embodiments, a group of MPC nodes can be designated as being in a "set" or ("signing party set," or "MPC set," "node set," "MPC node set," or similar), where each MPC node in the "set" operates in the same signing party computing environment, and considered to be associated with the signing party that is responsible for that signing party computing environment. In some examples, each set may comprise one node from each MPC cluster.

As shown in FIG. 1, SP-A Environment 119 may include a set of three MPC nodes: MPC Node 1 labeled 110, MPC Node 4 labeled 111, and MPC Node 7 labeled 112 (i.e., the foregoing node set 110, 111, 112 is associated with Signing Party A and operates in SP-A Environment 119). SP-B Environment 129 includes a set of three MPC nodes: MPC Node 2 labeled 120, MPC Node 5 labeled 121, and MPC Node 8 labeled 122 (i.e., the foregoing node set 120, 121, 122 is associated with Signing Party B and operates in SP-B Environment 129). SP-C Environment 139 includes a set of three MPC nodes: MPC Node 3 labeled 130, MPC Node 6 labeled 131, and MPC Node 9 labeled 132 (the foregoing node set 130, 131, 132 is associated with Signing Party C and operates in SP-C Environment 139).

Also depicted in FIG. 1 are three MPC clusters. The components of an MPC cluster include the MPC nodes of the cluster and the MPC client of the cluster. The first cluster includes MPC Node 1 110, MPC Node 2 120, MPC Node 3 130, and MPC Client 1 140; the second cluster includes MPC Node 4 111, MPC Node 5 121, MPC Node 6 131, and MPC Client 2 141; and the third cluster includes MPC Node 7 112, MPC Node 8 122, MPC Node 9 132, and MPC Client 3 142. In FIG. 1, the three MPC nodes in each cluster are depicted with the same pattern, to visually indicate that they are in the same cluster. More specifically, the nodes 110, 120, 130 in the first cluster are marked with a dotted pattern; the nodes 111, 121, 131 in the second cluster are marked with a diagonal pattern; and the nodes in the third cluster 112, 122, 132 are marked in a cross-hatched pattern. The first cluster may be referred to as "MPC Node Cluster 1," the second as "MPC Node Cluster 2," and the third as "MPC Node Cluster 3"; details regarding these clusters, and in particular regarding example configuration information that may be used by the components within a given cluster to communicate with each other, are provided below, including in connection with the description of FIG. 2.

In the digital asset custody system 100, each MPC cluster is capable of (and dedicated to) performing custody functionality for a single AO; that is to say, private key shares for multiple AO's are not stored in a single MPC cluster. In some embodiments, in a starting state, the digital asset custody system 100 would include zero MPC clusters; but then, when a new AO is enrolled in the digital asset custody system 100, an MPC cluster would be deployed in the digital asset custody system 100 via the cluster deployment process to custody digital assets for that AO. Consistent with the foregoing, in the example of FIG. 1, the three above-noted MPC clusters (involving components 110, 120, 130, 140, 111, 121, 131, 141, 112, 122, 132, 142) would have been deployed, with the MPC nodes in the clusters operating in the different signing party environments as shown in FIG. 1. Consistent with the foregoing, while FIG. 1 shows three MPC clusters, three is just an example number of MPC clusters that may operate in the digital asset custody system 100; during operation, large numbers of clusters (perhaps hundreds or thousands) may be deployed. Further, if an AO is de-enrolled from the digital asset custody system 100, then MPC clusters corresponding to that AO may be torn down/deallocated. In example embodiments, the configuration information for a deallocated MPC cluster may be archived because if that MPC cluster is needed in the future, the archived configuration information can be readily reallocated.

In some embodiments, the cluster deployment process for a given new cluster may include: (a) securely generating configuration information for the components in the cluster; (b) having the configuration information for the components in the cluster approved by the signing parties; (c) and deploying the components in the digital asset custody system 100 in accordance with the approved configuration information. Alternatively or additionally, a new cluster be deployed using the cluster deployment process as shown in FIGS. 3A-3B.

In addition to MPC nodes, other components may operate in the signing party computing environments 119, 129, 139. For example, SP-A Environment 119 may also include an MPC node initializer (Node Initializer A 115), an MPC node operator (Node Operator A 114), and a secrets manager (Secrets Manager A 113). Node Initializer A 115 and Node Operator A 114 may perform functionality in connection with the cluster deployment process, related to the generation and management of configuration information used by the components in a cluster. Among other functionality, Secrets Manager A 113 may securely store various kinds of information (such as private keys that are used for encrypted communications by the MPC nodes that operate in SP-A Environment 119, for when those MPC nodes engage in encrypted communications with other components in their respective clusters), in connection with the cluster deployment process. The other two signing party environments 129, 139 may include analogous components Secrets Manager B 123, Node Operator B 124, Node Initializer B 125, Secrets Manager C 133, Node Initializer C 135, Node Operator C 134, Secrets Manager C 133) that may perform the same and/or analogous functionality. (The MPC node initializers 115, 125, 135 may also be referred to as "node initializers" or similar; and the MPC node operators 114, 124, 134 may also be referred to as "node operators" or similar.)

In addition to the signing party environments 119, 129, 139, the digital asset custody system 100 may include the MPC Controller Subsystem 149, as shown in FIG. 1. The MPC Controller Subsystem 149 may include one or more MPC clients (such as MPC Client 1 140, MPC Client 2 141, and MPC Client 3 142). Each MPC client in the MPC Controller Subsystem 149 may be deployed as part of a cluster (as shown in FIG. 1 and noted above), and among other functionality may communicate with the MPC nodes in its cluster in connection with the wallet creation process and transaction generation process. Alternatively or additionally, each MPC client in the MPC Controller Subsystem 149 may function as an interface into that MPC client's cluster; i.e., other components in the digital asset custody system 100 may invoke functionality that can be performed by the cluster via communication with the MPC client.

The MPC Controller System 149 may include the MPC Controller 146, which may, among other functionality, play a coordinating role in the cluster deployment process; in some embodiments, the MPC Controller 146 collects and processes configuration information used in the cluster deployment process, as shown and described in FIGS. 3A-3B. The MPC Controller System 149 may also include the Client Secrets Manager 143; among other functionality, the Client Secrets Manager A 143 may securely store various kinds of information (such as private keys that are used for encrypted communications by the MPC clients that operate in the MPC Controller Subsystem 149), in connection with the cluster deployment process.

The MPC Controller Subsystem 149 may also include a blockchain service 147 (which may also be referred to as a "distributed ledger service" or similar). The blockchain service 147 may communicate information to/from the blockchain network 102 (details on which are provided below). As one example, the blockchain service 147 may communicate with the blockchain network 102 as part of the transaction generation process, by transmitting a blockchain transaction to the blockchain network 102.

In a variation on what is shown in FIG. 1, in some embodiments the MPC Controller Subsystem 149 may include multiple instances of the Client Secrets Manager 143, with one instance corresponding to each MPC client in the MPC Controller Subsystem 149 (e.g., one instance for MPC Client 1 140, one instance for MPC Client 2 141, and so on) and used for storing information just for the MPC client to which the instance corresponds.

In some embodiments, the MPC Controller Subsystem 149 (and, for clarity, the components thereof, such as MPC Client 1 140) may operate within the same computing environment within which other components of the digital asset custody system 100 (such as the frontend module 164) operate; in other embodiments, the MPC Controller Subsystem 149 may operate in its own dedicated computing environment (e.g., a private network); in other embodiments, the MPC Controller Subsystem 149 may operate within one of the signing party computing environments 119, 129, 139.

Also shown in FIG. 1 are the frontend module 164 and the AO device 160 (which includes the AO frontend module 162); the frontend module 164 and AO device 160 may implement, among other functionality, functionality that allows an AO user to interface with the digital asset custody system 100.

The AO device 160 (which may be, e.g., a computer, tablet, smartphone, or other computing device) may communicate over one or more data communications networks with the digital asset custody system 100. As will described in further detail below, the frontend module 164 and the AO frontend module 162 may allow the AO user to submit requests to the digital asset custody system 100, such as, e.g., a request to create a new wallet or public address for the AO (which may then be created, using the wallet creation process).

In some embodiments, the frontend module 164 may be or include one or more server-side modules for a web application, while the AO frontend module 162 may be or include one or more client-side modules for that web application; in such an instance, the AO frontend module 162 may be executed in a web browser running on the AO device 162 and may include HTML, JavaScript code, and/or similar code. In other embodiments, the AO front end module 162 may be a mobile application (e.g., an iOS or Android application), and the frontend module 164 may be or include one or more server-side modules that are configured to communicate with the mobile application via various data communication protocols and/or APIs.

The AO frontend module 162 may include a graphical user interface (GUI) module that is rendered/displayed on the AO device 160 and that the AO user may interact with.

This GUI module of the AO frontend module 162 may present the AO user with user interface elements (e.g., panels, windows, icons, buttons, menu entry options, etc.) that display information related to the digital asset custody system 100 and the AO's account, and that allow the AO user to engage with the digital asset custody system 100, e.g., to request certain operations be performed for the AO. For example, and as will be described in further detail below in connection with subsequent Figures, the AO user may use the GUI module of the AO frontend module 162 to log in to the digital asset custody system 100, to request that a digital wallet and/or public address be created for the AO, and/or for the digital asset custody system 100 to sign a transaction on the AO's behalf; and these activities may involve the AO frontend module 162 communicating messages to/from the frontend module 164 in the digital asset custody system 100, the frontend module 164 interfacing with the MPC Controller 146 in the MPC Controller Subsystem 149, and other operations within the digital asset custody system 100.

Also shown in FIG. 1 are configuration approval portals ("CAPs") (Signing Party A CAP 174, Signing Party B CAP 184, and Signing Party C CAP 194, which are collectively CAPs 154), along with a number of signing party computing devices (Signing Party A Device 170, Signing Party B Device 182, Signing Party C Device 190). Among other functionality, these CAPs 174, 184, 192 and signing party devices 170, 180, 190 may be used by signing party users in connection with the cluster deployment process; more particularly, they may be involved in having the configuration information for the components in the cluster approved by signing party users. In various example embodiments, these CAPs may each be a version control system, a source code repository, a software development/operations (DevOps) system, a workflow/collaboration platform, and/or a similar system/platform.

The signing party devices 170, 180, 190 may be, e.g., computers, tablets, smartphones, or other computing devices. Each of the signing party devices 170, 180, 190 may include a frontend module 172, 182, 192. Each of the CAPs 174, 184, 194 may be an instance of a configuration management application (which may include one or more web pages and/or other software modules), with each instance serving as an entry point (or gateway) to communicate with the digital asset custody system 100. The CAPs 174, 184, 194 implement functionality that allows signing party users to, via the frontend modules 172, 182, 192, review and approve proposed configurations for MPC nodes before the MPC nodes are deployed.

In various embodiments, each of the frontend modules 172, 182, 192 may be implemented as one or more mobile applications; alternatively or additionally, in an embodiments where the CAPs 154 include a web interface, the frontend modules 172, 182, 192 may be associated with those web interfaces and include code such as HTML and JavaScript. Each of the frontend modules 172, 182, 192 may include a GUI module that presents the signing party user of the respective signing party device 170, 180, 190 with user interface elements (e.g., panels, windows, icons, buttons, menu entry options, etc.) for viewing, reviewing, and approving proposed MPC node configurations for that signing party. The frontend modules 172, 182, 192 and CAPs 174, 184, 194 are described in more detail below, including in connection with FIGS. 3A-3B.

The blockchain network 102 shown in FIG. 1 may be, for example, one or more digital asset and/or distributed ledger networks or platforms. The blockchain network 102 may be composed of one or more computing systems (not shown in FIG. 1) that are configured to perform operations in accordance with the protocols for the digital assets/distributed ledger to which the blockchain network 102 pertains; these computing systems may be referred to as "miners" (in, e.g., some networks based on proof of work technology, such as Bitcoin) or "validators" (in, e.g., some networks based on proof of stake technology, such as Ethereum). The public blockchain addresses (i.e., the custody addresses) that the digital asset custody system 100 may use to custody digital assets may be implemented in accordance with (and/or be said to "exist" in) the blockchain network 102; and/or the blockchain network 102 may processes transactions that are sent to it in the signature generation process.

As noted above, in the digital asset custody system 100, each MPC cluster is capable of (and dedicated to) performing custody functionality for a single AO. An AO may have one, two, or more (including very large numbers of) different digital wallets in the digital custody system; the MPC clusters that operate on behalf of an AO may be configured in different ways to handle the different wallets. For example, in an embodiment a single MPC cluster may be used for an AO, with the single MPC cluster handling many different wallets; as another example, many MPC clusters may operate on behalf of an AO, with each handling a single wallet for the AO; as another example, many MPC clusters may operate on behalf of an AO, with each cluster handling various numbers of wallets (from one to many) for the AO. It should also be understood that each wallet in the digital asset custody system 100 may relate to any number of different public custody addresses.

As noted above the digital asset custody system 100 may include a number of secrets managers (e.g., the secrets managers 113, 123, 133, 143). A secrets manager (including those 113, 123, 133, 143 shown in FIG. 1) may be, for example, a secure database. Alternatively or additionally, in some embodiments a secrets manager may be accessible via other components in the digital asset custody system 100 via an HTTP/JSON API; and whenever it is described in this document that another component "provides data to," "sends data to," "places data in," "receives data from," "retrieves data from," or similar, a secrets manager, it should be understood that in some embodiments such operation is performed via an HTTP/JSON API. For ease of description, a secrets manager that stores information associated with an MPC node (e.g., the secrets managers 113, 123, 133) may be referred to herein as an "MPC node secrets manager" or "node secrets manager" or similar, and a secrets manager that stores information associated with an MPC client (e.g., the secrets manager 143) may be referred to herein as an "MPC client secrets manager," "client secrets manager," or similar.

The term "secret" is a term from cryptography that refers to data (e.g., a data element or data structure) that is supposed to be accessible only on a limited/restricted basis (e.g., by only a limited number of components/parties) and relates to security. Some examples of a secret are a private key, a private key share, a password, a passphrase, and authentication credentials. A secret may also be referred to herein as "secret data," "secret information," or similar. Data (e.g., a data element or data structure) that is not a secret may be referred to herein as "a non-secret," "non-secret information," "non-secret data," or similar. One example of a non-secret is a public key.

With the architecture of the digital asset custody system 100 shown in FIG. 1, because different private key shares are held in the separate signing party environments 119, 129, 139, no single signing party has on its own access to or can generate an AO's private key, and thus no single signing party can validly sign a blockchain transaction for an AO; this contributes to the security of the digital asset custody system 100. Additionally, as noted above the digital asset custody system 100 may begin operations with zero MPC clusters, but then very large numbers of MPC clusters may be deployed into the digital asset custody system 100, and also MPC clusters may be removed; thus, the capacity of the MPC digital asset custody system 100 may be dynamically adjusted as necessary, without compromising the security of the private key shares managed by the MPC nodes, which highlights the scalability of the digital asset custody system 100.

4. Description of FIG. 2—Example MPC Clusters

FIG. 2 relates to further details regarding how MPC clusters may be implemented in some embodiments. More particularly, FIG. 2 shows details regarding how the three MPC clusters shown in FIG. 1 (MPC Node Cluster 1 250, MPC Node Cluster 2 251, and MPC Node Cluster 3 252) may be deployed in the digital asset custody system 100 of FIG. 2 in an example configuration, including details regarding configuration information that may be used by components within a given cluster to communicate with each other.

As noted above, an MPC cluster may include two or more MPC nodes and an MPC client that are configured as an independent group separate from other MPC clusters. The components in each cluster are mutually exclusive, meaning that none of the components in an MPC cluster is component in any other MPC cluster. In other words, for a given MPC cluster, only the components belonging to that given MPC cluster are configured to conduct encrypted communication (e.g., using cryptographic node keys, as described below) with the other components in that given MPC cluster, and (b) other components belonging to other MPC clusters are not configured to conduct encrypted communication with components in that given MPC cluster. For a given component in an MPC cluster, the other components in the MPC cluster may be referred to as a "trusted partner MPC node" (or "trusted partner node," "partner node," "cluster partner node," "trusted component," "trusted partner component," or similar) of the given component.

As shown in FIG. 2, MPC Node Cluster 1 labeled 250 includes three MPC nodes (MPC Node 1 110, MPC Node 2 120, and MPC Node 3 130), each of which operates in a respective different computing environment of the three signing party computing environments 119, 129, 139, and MPC Client 1 140. After being deployed in the digital asset custody system 100, the components 110, 120, 130, 140 in MPC Node Cluster 1 250 may store and use configuration information as follows.

MPC Node 1 110 may store MPC Node 1 Configuration Information 210, which may include different information elements/data, including configuration information 212, configuration information 214, configuration information 216, and configuration information 218. As will be described in further detail below, this configuration information 210 may include keys (private & public) that may be used for encrypted communication for MPC Node 1 110 to communicate with other components 120, 130, 140 in the cluster 250, as well as other information.

Configuration information 212 (labeled "node1configs") may include: MPC node database connection credentials (db1_conn_str), MPC Node 1's MPC private key (node 1_private_key), MPC Node 1's MPC public key (node1_public_key), and the public key for the MPC Client 1 140 (client1_public_key).

Configuration information 214 (labeled "kind: MPCNode") may include: a name space corresponding to the signing party with which MPC Node 1 110 is associated (ns: partyA), an MPC node label (id: node1), MPC database connection credentials (con: db1_conn_str), MPC Node 1's private key (key: node 1_private_key), and MPC Node 1's address/URL (addr: node1_url). (Whenever the term "address" is used in referring to elements shown in FIG. 2, it should be understood that in some embodiments the address may be an Internet Protocol (IP) address.)

Configuration information 216 (labeled "kind: MPCNodePartner," to indicate that configuration information 216 relates to a partner MPC node that is a partner to MPC Node 1 110 included in MPC Node Cluster 1 250) may include: a name space corresponding the signing party with which MPC Node 1 110 is associated (ns: partyA), an MPC node label (id: node2), a reference to MPC Node 1 110 (node_ref: node1), MPC Node 2's public key (key: node 2_public_key), and an address/URL for MPC Node 2 120 (addr: node2_url).

As described above and as shown in FIG. 2, configuration information 216 may include information that relates to MPC Node 2 120; configuration information 218 may include all of the same/analogous data elements included in configuration information 216, except that configuration information 218 may differ, as shown in FIG. 2, to relate to MPC Node 3 130 instead of MPC Node 2 120.

MPC Node 1 110 may use this MPC Node 1 Configuration Information 210 in various ways. For example, MPC Node 1 110 may use the database connection information (in configuration information 212 and/or configuration information 214) to connect to a database, in order store non-secret information that MPC Node 1 100 may use during operation, such as public keys. Alternatively or additionally, MPC Node 1 110 may use the public key and private key information referenced above to communicate with the other components 120, 130, 140 in the cluster 250. For example, MPC Node 1 110 may: use the public key for the MPC Client 1 140 (client1_public_key) from configuration information 212 to encrypt information that it sends to MPC Client 1 140; use the public key for MPC Client 2 120 (node 2_public_key) from configuration information 216 to encrypt information that it sends to MPC Node 2 120; and use the public key for MPC Client 3 130 (node3_public_key) from configuration information 218 to encrypt information that it sends to MPC Node 3 130. Similarly, the other components 120, 130, 140 in the cluster 250 may have a public key for MPC Node 1 110 (this is shown in the node 1_public_key element in configuration information 243 in MPC Client 1 140, the node1_public_key element in configuration information 226 in MPC Node 2 120, and the node1 public key element in configuration information 236 in MPC Node 3 130); those other components 120, 130, 140 may use this public key to encrypt information that they send to MPC Node 1 110, and MPC Node 1 110 may use its private key (node1_private_key in configuration information 212 and/or configuration information 214) to decrypt such information after receipt. Alternatively or additionally, MPC Node 1 110 may use the address/URL information in configuration information 216, 218 (as well as address/URL information for MPC Client 1 140, not shown in FIG. 2) to locate, establish connections to, and/or communicate with the other components 120, 130, 140 in the cluster 250.

MPC Node 2 120 may store MPC Node 2 Configuration Information 220, which may include configuration information 222, 224, 226, 228, which correspond/are analogous to the configuration information 212, 214, 216, 218 stored by MPC Node 1 110 as described above; and MPC Node 2 120 may use this configuration information 222, 224, 226, 228 in analogous fashion as described above with respect to MPC Node 1 110, including to communicate with the other components 110, 130, 140 in the cluster 250. Similarly, MPC Node 3 130 may store MPC Node 3 Configuration Information 130, which may include configuration information 232, 234, 236, 2130, which also corresponds/is analogous to the configuration information 212, 214, 216, 218 stored by MPC Node 1 110 as described above; and MPC Node 3 130 may also use this configuration information 232, 234, 236, 238 in analogous fashion as described above with respect to MPC Node 1 110, including to communicate with the other components 110, 120, 140 in the cluster 250.

MPC Client 1 140 may store MPC Client 1 Configuration Information 240, which may include configuration information 241 and configuration information 243. Configuration information 241 may include: namespace information (e.g. a URL domain, and/or an identifier and/or other identifying information, for the AO associated with this MPC Client 1 140)(ns: qcust), an MPC client label (id: client1), an MPC client private key (client_1_private_key), an address/URL for MPC Client 1 (addr: client1_url), and a public key for MPC Client 1 140 (key: client1_public_key). Configuration information 243 (labeled "MPCClusterCredentials") may include: a public key (key: node1_public_key) and an address/URL (addr: node1_url) for MPC Node 1 110; a public key (key: node2_public_key) and an address/URL (addr: node2_url) for MPC Node 2 120; and a public key (key: node3_public_key) and an address/URL (addr: node3_url) for MPC Node 3 130. In analogous fashion as that described above with respect to the other components 110, 120, 130 in the cluster 250, MPC Client 1 140 may use the public key, private key, and address/URL information stored in configuration information 241 and configuration information 243 to communicate with the other components 110, 120, 130 in the cluster 250.

The keys shown in FIG. 2 (e.g., client1_private_key in configuration information 212, client1_public_key in configuration information 212, node2_public_key in configuration information 243, and so on) and that, as noted above, are used for communication amongst the components 110, 120, 130, 140 in a cluster 250 are referred to herein as "node keys," "cryptographic node keys," "MPC node keys," "cluster keys," "cryptographic cluster keys," and similar. It is important to note that these node keys are distinct from the private key shares that are used by MPC nodes in the digital asset custody system 100 to sign transactions.

The use of node keys for encryption/decryption as described above facilitates the components 110, 120, 130 in MPC Node Cluster 1 250 to securely communicate with each other (i.e., to communicate with each other using asymmetric encryption); other components (for example, MPC nodes in other clusters from MPC Node Cluster 1 250, such as those in MPC Node Cluster 2 251 and MPC Node Cluster 3 252) that do not have the node keys for MPC Node Cluster 1 250 would not be able to participate in encrypted communication with the components 110, 120, 130 in MPC Node Cluster 1 250 in the same manner. These communication and access boundaries contributed to protection and security for digital assets custodied in, and digital asset transactions generated by, the digital asset custody system 100.

MPC Node Cluster 2 251 may include three MPC nodes 4-6 111, 121, 131 (which operate across the three signing party computing environments 119, 129, 139), and a corresponding MPC Client 2 141. The components 111, 121, 131, 141 in MPC Node Cluster 2 251 may include configuration information (not shown in FIG. 2) that corresponds/is analogous to the configuration information 210, 220, 230, 240 described above with respect to the components 110, 120, 130, 140 in MPC Node Cluster 1 250; and the components 111, 121, 131, 141 in MPC Node Cluster 2 251 may use their configuration information and communicate in analogous fashion as the components 110, 120, 130, 140 in MPC Node Cluster 1 250 as described above. Thus, as with the components in MPC Node Cluster 1 250 as noted above, the components within MPC Node Cluster 2 251 may exchange encrypted communications amongst each other using the cluster's node keys, and components that are not in MPC Node Cluster 2 251 (and which do not have access to the cluster's node keys) may not participate in those encrypted communications. Initialization, configuration, and deployment procedures analogous to those described above for MPC Node Cluster 1 250 may also be implemented for MPC cluster 2 251. In this way, the MPC Controller 146 may instantiate a second MPC cluster of MPC nodes associated with a second AO that includes one MPC node from each of the different signing party computing environments and a corresponding MPC client.

MPC Node Cluster 3 252 may include three MPC nodes 7-9 112, 122, 132 (which operate across the three signing party computing environments 119, 129, 139), and a corresponding MPC Client 3 142. The components 112, 122, 132, 142 in MPC Node Cluster 3 252 may include configuration information (not shown in FIG. 2) that corresponds/is analogous to the configuration information 210, 220, 230, 240 described above with respect to the components 110, 120, 130, 140 in MPC Node Cluster 1 250; and the components 112, 122, 132, 142 in MPC Node Cluster 3 252 may use their configuration information and communicate in analogous fashion as the components 110, 120, 130, 140 in MPC Node Cluster 1 250 as described above. Thus, as with the components in MPC Node Cluster 1 250 as noted above, the components within MPC Node Cluster 3 252 may exchange encrypted communications amongst each other using the cluster's node keys, and components that are not in MPC Node Cluster 3 252 (and which do not have access to the cluster's node keys) may not participate in those encrypted communications. Initialization, configuration, and deployment procedures analogous to those described above for MPC Node Cluster 1 may also be implemented by MPC cluster 3. In this way, the MPC Controller 146 may instantiate a third MPC cluster of MPC nodes associated with a third AO that includes one MPC node from each of the different signing party computing environments and a corresponding MPC client.

Whenever it is described in this document that any component in a deployed MPC cluster communicates with one or more other components in that MPC cluster (including, for example, in connection with the processes shown in FIG. 6 and/or FIG. 7), it should be understood that, in some embodiments, such communication takes place with the use of node keys as described above and/or in accordance with other configuration information (e.g., the configuration information 210, 220, 230, 240 used in MPC Node Cluster 1 250) as described above.

Details regarding how the configuration information shown in FIG. 2 is generated in some embodiments are provided below, including in connection with the process of FIG. 3A-3B.

5. Description of FIG. 3A-3B, FIG. 4, and FIG. 5—Cluster Deployment Process

As noted above, the digital asset custody system 100 may implement a cluster deployment process, to deploy a new MPC cluster. FIGS. 3A-3B (along with FIG. 4 and FIG. 5) show how the cluster deployment process may be implemented in some embodiments.

As shown in FIGS. 3A-3B, in this example process, the MPC Controller 146 may communicate with other components in the digital asset custody system 100 to generate various kinds of configuration information, to deploy MPC Node Cluster 1 250. For clarity: as the process of FIG. 3A begins, the components 110, 120, 130, 140 of MPC Node Cluster 1 250, while shown in FIG. 3A, have yet to be instantiated.

At step 300, the MPC Controller 146 may send to Node Initializer A 115 (which is operating in SP-A Environment 119) one or more data messages that indicate a request for initial MPC node configuration information for an MPC node that will operate in the signing party computing environment A 119. (These one or more data messages may be referred to as a "request for initial configuration signal.")

At step 302, MPC Node 1 initial configuration information (which may include both (a) non-secret information and (b) identifiers that correspond to secret information, as described below) may be generated. More particularly, step 302 may be performed in some embodiments as follows. Node Initializer A 115 may receive the request from the MPC Controller 146. In response to the request received from the MPC Controller 146, Node Initializer A 115 may generate information that includes: a database connection string (which is a secret, and which include credentials for connecting to a database); a node private key (which is a secret), a node public key (non-secret), and a client public key (non-secret). For each secret from the foregoing information (e.g., for the database connection string and the private key), Node Initializer A 115 may send the secret to Secrets Manager A 113; Secrets Manager A 113 may generate and return to the Node Initializer A 115 a unique identifier corresponding to the secret, and store the secret. Node Initializer A 115 may then combine the generated non-secret information and the secret identifier(s) received from Secrets Manager A 113 to generate MPC Node 1 initial configuration information. An example of MPC Node 1 initial configuration information that may be generated at step 302 is MPC Node 1 Initial Configuration 410 as shown in FIG. 4, which is described in detail below.

In step 304, Node Initializer A 115 may send one or more data messages to the MPC Controller 146 that include the MPC Node 1 initial configuration information (such as MPC Node 1 Initial Configuration Information 410 from FIG. 4).

At step 306, similar/analogous communication and operations corresponding to steps 300-304 may be performed by MPC node initializers 125 and 135 and secrets managers 123 and 133 for initial configuration information for MPC Node 2 120 and MPC Node 3 130, with these MPC node initializers 125, 135 operating respectively in SP-B Environment 129 and SP-C Environment 139. Prior to configuring, the MPC controller 146 may be provided with information as to the number of MPC nodes and the number of signing parties to be included in each MPC cluster. In this example embodiment the number of MPC nodes and signing parties per MPC cluster is three; but fewer or greater numbers of MPC nodes and signing parties may be used by the MPC controller 146. Consistent with the foregoing, step 302 may include the generation of MPC Node 2 configuration information and MPC Node 3 configuration information, and the communication of such information to the MPC Controller 146; MPC Node 2 Initial Configuration Information 420 and MPC Node 3 Initial Configuration Information 430 from FIG. 4 are examples of initial configuration information that may be generated and communicated at step 306; further details regarding FIG. 4 are provided below.

At step 308, which is similar/analogous to step 302 but relates to MPC Client 1 instead of MPC Node 1, the MPC Controller 146 (an initializer is not used for the MPC clients in this example embodiment but may be in other example embodiments) may generate initial configuration information for MPC client 1 140, and secrets related to this initial configuration information for MPC Client 1 140 may be stored in Client Secrets Manager 143. More particularly, in some embodiments step 308 may be performed as follows. The MPC Controller 146 may generate information for the MPC Client 1 140 that includes: namespace information (e.g. a URL domain, and/or an identifier and/or other identifying information, for the asset owner that will be associated with MPC Client 1 140), an MPC client label (or identifier), an MPC client private key (which is a private "node key" as used herein), an address/URL that MPC Client 1 140 may use, and a public key for MPC Client 1 140 (which is a public "node key" as used herein). For each secret from the foregoing information (e.g., for the private key), the MPC Controller 146 may send the secret to the Client Secrets Manager 143; the Client Secrets Manager 143 may generate and return to the MPC Controller 146 a unique identifier corresponding to the secret, and store the secret. The MPC Controller 146 may combine the generated non-secret information and the secret identifier(s) received from Client Secrets Manager 143 to generate the MPC Client 1 initial configuration information. Consistent with the foregoing, MPC Client 1 Initial Configuration Information 440 of FIG. 4 is an example of initial configuration information that may be generated at step 308.

Referring now to FIG. 4, FIG. 4 shows MPC Node 1 Initial Configuration Information 410 (which includes configuration information 412), MPC Node 2 Initial Configuration Information 420 (which includes configuration information 422), MPC Node 3 Initial Configuration Information 430 (which includes configuration information 432), and MPC Node 1 Initial Configuration Information 440 (which includes configuration information 441). In the following pairings, the data elements from FIG. 4 may have the same or similar characteristics as the corresponding data elements from FIG. 2: configuration information 410/412 and configuration information 210/212; configuration information 420/422 and configuration information 220/222; configuration information 430/432 and configuration information 230/232; and configuration information 440/441 and configuration information 240/241; except that data elements from FIG. 4 that pertain to secrets are identifiers for secrets rather than the secrets themselves (e.g., node_1_private_key_id in configuration information 412 in FIG. 4 is an identifier related to a private node key, whereas node1_private_key in configuration information 212 in FIG. 2 is the private node key itself).

Referring again to FIG. 3A, at step 310, based on the initial MPC node configuration information for MPC Nodes 1-3 110, 120, 130 received in steps 302 and 306 and on the initial MPC client configuration information from step 308 (e.g., the initial configuration information 410, 420, 430, 440 shown in FIG. 4), the MPC Controller 146 may generate four sets of deployment configuration information, which include one set for each of the MPC nodes 1-3 110, 120, 130 in MPC Node Cluster 1 250 and a set for MPC client 1 140. (These four sets of configuration information generated at step 310 are referred to herein as "deployment configuration information" or "deployment configuration(s)," or similar; the portions of these deployment configuration information that are MPC node deployment configuration information are referred to as "node deployment configuration information," "node deployment configuration(s)," or similar; and the portions that are MPC client deployment configuration information are referred to as "MPC client deployment configuration information," "client deployment configurations," or similar.)

Each set of deployment configuration information from the four sets generated at step 310 pertains to one of the four components 110, 120, 130, 140 that will be in the cluster (MPC Node Cluster 1 250). More specifically, for a given set of deployment configuration information that pertains to a given one of the four components 110, 120, 130, 140, the deployment configuration information contains (a) identifiers for secrets for that component, as generated in steps 302, 306, or 308, and (b) non-secret configuration information associated with the other three components from the cluster (such as address/URL information and public node keys, and also as generated in steps 302, 306, or 308), which the component will be able to use after deployment to communicate with the other three components.

Referring now to FIG. 5, FIG. 5 shows example deployment configuration information (more particularly, four sets thereof) that may be generated by the MPC Controller 146 at step 310. FIG. 5 shows MPC Node 1 Deployment Configuration Information 510 (which includes configuration information 512, 514, 516, 518), MPC Node 2 Deployment Configuration Information 520 (which includes configuration information 522, 524, 526, 528), MPC Node 3 Deployment Configuration Information 530 (which includes configuration information 532, 534, 536, 538), and MPC Client 1 Deployment Configuration Information 540 (which includes configuration information 541/543). In the following pairings, the data elements from FIG. 5 may have the same or similar characteristics as the corresponding data elements from FIG. 2: configuration information 510/512/514/516/518 and configuration information 210/212/214/216/218; configuration information 520/522/524/526/528 and configuration information 220/222/224/226228; configuration information 530/532/534/536/538 and configuration information 230/232/234/236/238; and configuration information 540/541/543 and configuration information 240/241/243; except that data elements from FIG. 5 that pertain to secrets are identifiers for secrets rather than the secrets themselves (e.g., node_1_private_key_id in configuration information 512 in FIG. 5 is an identifier related to a private node key, whereas node1_private_key in configuration information 212 in FIG. 2 is the private node key itself).

In some embodiments, the MPC Controller 146 may generate the deployment configuration information at step 310 at least in part as follows: for the deployment configuration information that pertains to a particular component (e.g., for MPC Node 1 Deployment Configuration Information 510), that deployment information may be generated based on (a) the initial deployment information that pertains to that component (e.g., configuration information 512 and/or 514 may be based on configuration information 410/412) and (b) the initial deployment configuration information that pertains to the other components that will be in the cluster (e.g., configuration information 516 may be based on configuration information 420/422, configuration information 518 may be based on 430/432, and configuration information 512 may be based on 440/441).

Referring now to FIG. 3B, which continues from FIG. 3A, at step 312, a verification/approval process for the deployment configuration information may be performed. Step 312 may include the MPC Controller 146 sending, in one or more data messages, for each of the three sets of MPC node deployment configuration information, the set of MPC node deployment configuration information to the corresponding configuration approval portal 174, 184, 194 for the signing parties A-C(CAPs A-C). For example, the MPC Controller may send the deployment configuration information for MPC Node 1 110 to the Signing Party A CAP 174, and the deployment configuration information for MPC Node 2 120 to the Signing Party B CAP 184, and so on.

In some embodiments, step 312 may be performed, for each signing party A-C, as follows: (a) the frontend module 172, 182, 192 (running on a signing party device 170, 180, 190) may receive the corresponding MPC node deployment configuration from its corresponding CAP 154 (i.e., one of 174, 184, 194) and display it (via a GUI module of the frontend module 172, 182, 192); (b) the displayed node deployment configuration information (including identifiers) may be reviewed by the signing party user operating the device 170, 180, 190, and the signing party user may provide user input (via the GUI module) that indicates that that the node deployment configuration information is approved or disapproved; (c) the frontend module 172, 182, 192 may communicate information to the corresponding CAP 154 that indicates that the node deployment configuration information has been approved or disapproved by the signing party; and (d) in an instance where the frontend module 172, 182, 192 has communicated information that indicates that the node deployment configuration information has been approved by the signing party, the CAP 154 may communicate the node deployment configuration information to its corresponding node operator 114, 124, 134. In various embodiments, the CAP 154 may communicate the node deployment configuration information to the node operator 114, 124, 134 in different ways; as one example, the CAP may "push" the node deployment configuration information to a repository that the node operator 114, 124, 134 is monitoring, and the node operator 114, 124, 134 may detect (and/or be notified) that the new node deployment configuration information is present/available in the repository.

Each signing party A-C at step 312 can access and review only its corresponding node deployment configuration information, and cannot access any of the other node deployment configuration information corresponding to other signing parties. When reviewing the deployment configuration information (in accordance with, e.g., action (c) noted above), a signing party user may validate, among other information, that each MPC cluster is authorized to be created, configured, and deployed. A newly created but unexpected MPC cluster, for example, may be detected as unauthorized and prevented from deployment and/or invalidated by the signing party. As another example, a clone of an existing MPC cluster may be detected as unauthorized and prevented from deployment and/or invalidated by the signing party.

Additionally, in some embodiments the MPC client deployment configuration may be approved in a similar/ analogous fashion as that described above with respect to the node deployment configurations. In the following description, the term "Client Deployment Configuration Approval Signing Party (CDCA Signing Party)" is used to refer to a signing party that reviews/approves the MPC client deployment configuration information. In some embodiments, one of the signing parties that reviews the MPC node deployments configurations (e.g., Signing Party A-C) may be designated as the CDCA Signing Party; in such an embodiment, at step 312 the MPC Controller 364 may additionally communicate the MPC client deployment configuration to (a) the CAP for the CDCA Signing Party that is also involved in the approvals for the node deployment configurations (e.g., one of the CAPs 154) or (b) a separate CAP (not shown in the Figures) for the CDCA Signing Party that is dedicated to just MPC client deployment configurations. Alternatively, in some embodiments, a different signing party (i.e., not Signing Party A, Signing Party B, or Signing Party C) may act as CDCA Signing Party, via a CAP (also not shown in the Figures) and signing party device (also not shown in the Figures) that are used by the CDC Signing Party, but that have analogous characteristics to/function in the analogous manner as the CAPs 154/signing party devices 172, 182, 192 shown in the Figures and described herein. Once the MPC client deployment configuration is reviewed/approved, the CAP that is involved in the approval (in accordance with any of the foregoing embodiments) may communicate the approved MPC client deployment configuration to the MPC Controller; in some embodiments, the MPC client deployment configuration may be pushed to a repository as described above with respect to the node deployment configurations.

At step 314 (after approval at step 312), Node Operator A 114 may deploy MPC Node 1 110 in its corresponding MPC Node Cluster 1 in accordance with the corresponding approved node deployment configuration information. In some embodiments, this may be performed as follows: (a) Node Operator A 114 may access Secrets Manager A 113 using the identifiers of the MPC Node 1 configuration secrets (including e.g., db1_conn_str_id and node1_private_key_id) (e.g., this may include Node Operator A 114 sending one or more queries or requests to Secrets Manager A 113, with the queries or requests including said identifiers); (b) Secrets Manager A 113 may then lookup the secrets based on the identifiers, and return to Node Operator A 114 the corresponding values for the secrets (including e.g., the database connection credentials and the MPC Node 1 private key); and (c) upon obtaining the values for the secrets from Secrets Manager A 113, Node Operator A 114 would have the information required for instantiation/configuration of MPC Node 1 110 (e.g., would have the information in MPC Node 1 Configuration Information 210 as shown in FIG. 2), and may instantiate and configure MPC Node 1 110 in accordance said information.

In some embodiments, the instantiation/configuration of MPC Node 1 100 at step 314 may include the allocation/instantiation of computing resources for MPC Node 1 100 within the digital asset custody system 100. In some embodiments wherein MPC Node 1 110 operates in a container and/or in a virtual machine (VM), prior to the deployment of MPC Node 1 100, the container and/or the VM would not have been instantiated/running; but as part of the instantiation/configuration of MPC Node 1 100, Node Operator A 114 may instantiate the container and/or VM for MPC Node 1 100, and then MPC Node 1 100 would be instantiated and run in the container and/or in the VM, configured to use parameter values as shown in MPC Node 1 Configuration Information 210 in FIG. 2.

Step 316, step 318, and step 320 may be performed in the same/analogous fashion as step 314 as described above, by the components 124, 123, 134, 133, 146, 143 in the other signing party environments 129, 139 and MPC Controller Subsystem 149, to deploy MPC Node 2 120, MPC Node 3 130, and the MPC Client 140.

The example process shown in FIGS. 3A-3B may be rapidly and efficiently performed to instantiate, configure, approve, and deploy any number of new MPC clusters of MPC nodes and corresponding MPC clients in the digital asset custody system 100 as more asset owners and/or system capacity demands dictate. The addition of a new MPC cluster with an MPC client and MPC nodes may be initiated, for example, by an AO device 160 sending a request via the AO frontend module 162 to the MPC Controller 146 via the frontend module 164. MPC clusters and corresponding MPC clients may also be removed from the digital asset custody system 100 as system demands are reduced. Accordingly, the digital asset custody system 100 may be dynamically and flexibly scaled as needed or desired in a short time using relatively small amounts of computation and storage resources.

As described above, a number of different types of information may be generated/communicated/processed in connection with the process of FIGS. 3A-3B. For clarity regarding the vocabulary used in connection with these different types of information, as used in connection with the description of FIGS. 3A-3B as well as elsewhere herein:

(a) the terms "MPC node initial configuration information," "node initial configuration information," or similar refer to the information generated at step 302 and communicated at step 304, examples of which are shown at 410, 420, and 430 in FIG. 4;

(b) the terms "MPC client initial configuration information," "client initial configuration information," or similar refer to the information generated at step 308, an example of which is shown at step 440 in FIG. 4;

(c) the term "initial configuration information," "initial configuration(s)," and similar refer to node initial configuration information (as referred to in (a) in this sentence) and/or client initial configuration information (as referred to in (b) in this sentence);

(d) the terms "deployment configuration information," "deployment configuration(s)," or similar refers to the information generated at step 310, examples of which are shown at 510, 520, 530, and 540 of FIG. 5; and the portions of these deployment configuration information that are MPC node deployment configuration information are referred to as "node deployment configuration information," "node deployment configuration(s)," or similar; and the portions that are MPC client deployment configuration information are referred to as "MPC client deployment configuration information," "client deployment configurations," or similar; and (e) the term "configuration information" or similar refers generally to information that is used in connection with the deployment and/or configuration of an MPC node and/or MPC client; depending on the context, "configuration information" or similar may refer to any of (a)-(d) in this sentence, and/or any of the configuration information shown in FIG. 2 (e.g., configuration information 210, 220, 230, 240), and/or subsets and/or combinations of any of the foregoing, as should be clear from the context.

6. Description of FIG. 6—Wallet Creation Process

FIG. 6 is a sequence diagram showing an example wallet creation process, which involves the creation of a new wallet and new public custody address. Shown in FIG. 6 are the AO device 160, the frontend module 164, and components 110, 120, 130, 140 of MPC Node Cluster 1 250. The process of FIG. 6 may be performed, as an example, after the AO has been enrolled into the digital asset custody system 100 and the MPC Node Cluster 1 250 has been deployed the process of FIG. 3A-3B.

At step 600, the AO user may provide user input to the AO device 160 (via a GUI module of the AO frontend module 162 (not shown in FIG. 6) on the AO device 160) that indicates that a new wallet and public address should be created for the AO. The AO device 160 may transmit information (in, e.g., one or more data messages) that indicates that a new wallet/public address should be created for the AO to the frontend module 164; this information that indicates that a new wallet/public address should be created ("new wallet request information") may include, e.g., information that identifies the AO, information that indicate the type of digital asset that the public address should be created for (e.g., Bitcoin), and so on. The frontend module 164 in the digital asset custody system 100 may receive the new wallet request information; in response to receiving the new wallet request information, the frontend module 164 may transmit the new wallet request information (in, e.g., one or more data messages) to the MPC Client 1 140.

At step 602, the MPC Client 1 140 may receive the new wallet request information. In response to receiving the new wallet request information, the MPC Client 1 140 may initiate the creation of a corresponding new wallet/public address. The creation of the new wallet/public address may include the components in MPC Cluster 1 250 (MPC Client 1 110, MPC Node 1, MPC Node 2 130, and MPC Node 3 130) exchanging data messages, in accordance with one or more MPC protocols and using node keys, to generate wallet information, which may be based on the new wallet request information or portions thereof and/or include a new public custody address for the AO.

Alternatively or additionally, in some embodiments, step 602 may be performed as follows and/or include the following operations: (a) each MPC node 110, 120, 130 in the cluster 250 may generate its own respective private key share (using, e.g., a distributed key generation (DKG) approach); (b) based on the key shares (though without the key shares being transmitted between the nodes 110, 120, 130), the nodes 110, 120, 130 may generate/derive a public custody address for the AO; (c) each of the nodes 110, 120, 130 may securely store the private key share that it generated in (a), in e.g. a secrets manager 113, 123, 133, a secure database, or other type of data storage. In some embodiments, each or any of the foregoing operations (a)-(b) may be performed using one or more MPC protocols that involve the transmission of data messages between the nodes 110, 120, 130, which data messages may be communicated using node keys. In some embodiments, the wallet created at step 602 may be an HD wallet, and the private key shares and the custody address generated at step 602 may be derived from the root private key for the HD wallet (potentially via multiple derivations/other operations; e.g., the new custody public address may correspond to a child key/grandchild key/further descendant key from the root private key); though, consistent with the foregoing, in some embodiments, at no time during the performance of step 602 do any of the involved components (e.g. 110, 120, 130, 140) possess/store an entire private key for the wallet for the AO, as the use of MPC protocols allows for operations that correspond to the possession of a private key when the entire private key itself is not used.

At step 604, the MPC Client 1 140 may transmit information (in, e.g., one or more data messages) to the frontend module 164 related to the creation of the new wallet and custody address. This information ("new wallet information") may indicate that the new wallet and/or custody address have been created, and may include the custody address. Then, the frontend module 164 may communicate the new wallet information (in, e.g., one or more data messages) to the AO device 160 (e.g., to AO frontend module 162 in the AO device 160).

At step 606, the user interface at the AO device 160 (e.g., the GUI of the AO frontend module 162) may be updated to indicate that the new wallet/public address have been created. This may include the new custody address being displayed in the GUI of the AO frontend module 162.

After the new custody address has been created (and/or after has been communicated to the AO device at step 606), the AO may use the custody address for various purposes at step 608. For example, the AO may use the custody address as the destination in one or more blockchain transactions, to send digital assets to the custody address. To do so, the AO may use other software/hardware, outside of the digital asset custody system 100, to generate/transmit the transaction to transfer assets to the custody address. Those digital assets would then be understood to be custodied by the digital asset system 100, as they would be associated with a custody address that the digital asset custody system 100 has created.

As noted above, in some embodiments, the MPC Controller Subsystem 149 may include multiple instances of the Client Secrets Manager 143, with one instance corresponding to each MPC client in the MPC Controller Subsystem 149 (e.g., one instance for MPC Client 1 140, one instance for MPC Client 2 141, and so on). In some such embodiments, the process shown in FIG. 6 may be implemented but instead of the Client Secrets Manager 143 performing operations as shown and described above, a client secrets manager that is specific to the MPC client involved in the process (e.g., MPC Client 1 140) may perform such operations.

In some embodiments, in addition to or as an alternative to the wallet creation process shown in FIG. 6, the digital asset custody system 100 may implement another process (a "custody address creation process") that is similar to the wallet creation process that is shown in FIG. 6, but instead of resulting in the creation of a wallet and new public address for the wallet, the custody address creation process may be performed when a wallet already exists for the AO (because the wallet was created e.g. via the wallet creation process of FIG. 6) and results in just the creation of a new custody address that is added to the already-existing wallet. The custody address creation process may operate in essentially the same manner as the wallet creation process shown in FIG. 6, except limited to just the creation of the new custody address (e.g., the new wallet request information at step 600 would indicate which type of digital asset the custody address should be created for but not indicate that a new wallet should be created, step 602 would be performed substantially as described except that the custody address would be added to an already-existing wallet after creation rather than involve the creation of a new wallet, and so on).

In some embodiments, the digital asset custody system 100 may implement a wallet creation process that is similar to the process shown in FIG. 6, except that, instead of a user interface being used by an AO user to interface with the digital asset custody system (e.g., per the user input and feedback described at steps 600/608), an application programming interface (API) may be used to interface with the digital asset custody system 100. In some such embodiments, the digital asset custody system 100 may include a component that acts as the API endpoint (which may be an API gateway (not shown in the Figures), the frontend module 164, or some other component), and the process may operate in essentially the same manner as the wallet creation process shown in FIG. 6 and described above, except that: (a) at step 600, instead of user input being provided as described above, a computing device that operates on behalf of the AO (the "AO API device") may transmit the new wallet request information (in one or more data messages) to the API endpoint, which may then communicate the new wallet request information to the MPC Client 1 140; and (b) at steps 604 and 606, instead of the new wallet information being communicated to the AO Device 160 and displayed thereon, the new wallet information may be received from the MPC Client 1 140 by the API endpoint and then communicated (in one or more data messages) to the AO API device. In some such embodiments, the API may be implemented using Hypertext Transfer Protocol (HTTP) (i.e., the data messages communicated between the AO API device and API endpoint may be HTTP messages) and/or the information communicated between the AO API device and API endpoint may be formatted in JSON, YAML, XML, or some other format.

Alternatively or additionally, in some embodiments the digital asset custody system may implement the custody address creation process noted above using an API, in essentially the same manner as described above with respect to the wallet creation process being implemented via an API (e.g., using an API endpoint, an AO API device, with the above-noted modifications at step 600, 604, 606, and so on). Although the wallet creation process shown in FIG. 6 relates to MPC Node Cluster 1 250, MPC Node Cluster 1 250 is used as an example, and the process shown in FIG. 6 and described above may be performed, mutatis mutandis, for each of the MPC node clusters deployed in the digital asset custody system 100.

7. Description of FIG. 7—Transaction Generation Process

FIG. 7 is a sequence diagram showing an example transaction generation process that may be performed by the digital asset custody system 100 (i.e., by components thereof); this example transaction generation process may include signing of a new digital asset transaction by the nodes in an MPC cluster (e.g., MPC Node Cluster 1 250) using private key shares, and the transmission of the signed digital asset transaction to a blockchain network (e.g., to blockchain network 102).

Shown in FIG. 7 are the AO device 160 and the blockchain network 102, along with components of the digital asset custody system 100, namely the fronted module 164, the blockchain service 167, and the components 110, 120, 130, 140 of MPC Node Cluster 1 250. The process of FIG. 7 may be performed, as an example, after the MPC Node Cluster 1 250 has been deployed using the processes of FIGS. 3A-3B, the AO has been enrolled into the digital asset custody system 100, and the digital asset custody system 100 has been providing custody for some digital assets of the AO in a digital wallet for the AO, at a custody address (with that digital wallet and/or custody address created via, e.g., the process of FIG. 6).

At step 700, the AO user may provide user input to the AO device 160 (via a GUI module of the AO frontend module 162 (not shown in FIG. 6) on the AO device 160) that indicates a request for the digital asset custody system 100 to transfer some digital assets in custody at the digital asset custody system 100 to a destination public blockchain address. Said another way, the request may indicate a request for the digital asset custody system 100 to sign a blockchain transaction that involves transferring some digital assets in the AO's digital wallet to the destination public blockchain address. This information generated/collected at step 700 ("transaction request information") may include and/or indicate information such as: (a) the source address (i.e., custody address) from which digital assets should be transferred; (b) which digital assets (and/or amounts thereof) should be transferred; and (c) the destination public blockchain address. The AO device 160 (e.g., via the AO frontend module 162) may send the transaction request information (in e.g., one or more data messages) to the frontend module 164 in the digital asset custody system 100. The frontend module 164 may then send the transaction request information (in e.g., one or more data messages) to the MPC Client 1 140.

At step 702, the MPC Client 1 140 may receive the transaction request information. In response to the transaction request information, the MPC Client 1 140 may initiate the generation and signing of a digital asset transaction; the generation and signing of the digital asset transaction may include the components 110, 120, 130, 140 in MPC Cluster 1 250 exchanging data messages and using the respective private key shares of the nodes 120, 130, 140 (in accordance with one or more MPC protocols) to generate the signed transaction (with the signed transaction including the transaction request information or portions thereof); after the transaction is generated/signed, the MPC Client 1 140 may provide/transmit the signed transaction to the blockchain service 147.

Alternatively or additionally, in some embodiments, step 702 may be performed as follows and/or include the following operations: (a) MPC Client 1 140 may generate a new blockchain transaction that includes information from/is based on the transaction request information, and that includes the transaction request information (e.g., the source address for the transaction, the destination address for the transaction and which digital assets (and/or amounts thereof) should be transferred in the transaction), and/or other information (such as an identifier for the transaction); (b) MPC Client 1 140 may send the blockchain transaction to each of the MPC nodes 110, 120, 130 250 in the cluster 250; (c) each of the MPC nodes 110, 120, 130 may generate a partial signature based on the blockchain transaction and their respective private key share, and then send the generated partial signature to MPC Client 1 140; (d) MPC Client 1 140 may generate a full (threshold) signature based on the received partial signatures (e.g., by combining the partial signatures), and then put/include the full signature in the blockchain transaction; and MPC Client 1 140 may then provide/transmit the blockchain transaction (with the full signature) to the blockchain service 147. In some embodiments, each or any of the foregoing operations (a)-(b) may be performed using one or more MPC protocols that involve the transmission of data messages between the nodes 110, 120, 130, which data messages may be communicated using node keys.

At step 704, the blockchain service 147 may send the signed transaction to the blockchain network 102 (in, e.g., one or more data messages).

At step 706, MPC Client 1 140, the frontend module 164, and the AO device 160 may communicate information and perform operations to update the user interface at the AO device 160 to indicate that the transaction has been sent to the blockchain network 102. In some embodiments, step 706 may be performed as follows and/or include the following operations: (a) MPC Client 1 140 may generate information regarding the transaction and indicating that the transaction has been sent to the blockchain network ("transaction report information"), which may include, e.g., an identifier for the transaction; (b) MPC Client 1 140 may provide/transmit the transaction report information (in, e.g., one or more data messages) to the frontend module 164; (c) the frontend module 164 may transmit the transaction report information (in, e.g., one or more messages) to the AO device 160; and (d) the AO device 160 may receive the transaction report information (via e.g. the AO frontend module 162) and then update the user interface at the AO device 160 (e.g., the GUI of the AO frontend module 162) to reflect the transaction report information (e.g., to indicate that the transaction has been transmitted, and to display information regarding the transaction, such as the transaction identifier).

At step 708, the blockchain network 102 may process the transaction; this may include the blockchain network 102 verifying that the transaction is properly signed, adding the transaction to a block, and then adding the block to the blockchain that is managed by the blockchain network 102. In some embodiments, this may include one or more of the computing systems in the blockchain network 102 performing processing that is based on (a) the public address from which the transaction originates and (b) the digital signature in the transaction, to verify that the digital signature was generated in accordance with a private key that the public address would have been derived from.

In some embodiments, the components in an MPC cluster (e.g., the clusters 250, 251, 252 shown in FIG. 1 and FIG. 2 herein) may rotate/regenerate the key shares for the MPC nodes in the cluster; e.g., using one or more MPC protocols, the components in the cluster may generate new key shares based on current key shares (and/or other input data), and then store (in e.g. a secrets manager 113, 123, 133, a secure database, or other type of data storage) the new key shares. Thus, in some embodiments the key shares that the MPC nodes use to generate partial signatures (as shown at step 702 and described above) may be (a) key shares that are generated in accordance with the wallet generation process (and/or custody address creation process) of FIG. 6 ("initial key shares") and then stored and used to generate the partial signatures, or (b) key shares that are not initial key shares but are instead generated via rotation/regeneration as noted above (e.g., via one or more MPC protocols used for rotation/regeneration after the initial key shares are generated). In various embodiments, the rotation/regeneration of key shares may be performed periodically, based on some triggering event, and/or in connection with or as part of a key share replication and/or backup process.

In some embodiments, the digital asset custody system 100 may implement a transaction generation process that is similar to the process shown in FIG. 7, except that, instead of a user interface being used by an AO user to interface with the digital asset custody system (e.g., per the user input and feedback described at steps 700/706), an API may be used to interface with the digital asset custody system 100. In some such embodiments, the digital asset custody system 100 may include a component that acts as the API endpoint (which may be an API gateway (not shown in the Figures), the frontend module 164, or some other component), and the process may operate in essentially the same manner as the transaction generation process shown in FIG. 7 and described above, except that: (a) at step 700, instead of user input being provided as described above, an AO API device (i.e., a computing device operating on behalf of the AO) may transmit the new transaction request information (in one or more data messages) to the API endpoint, which may then communicate the new transaction request information to the MPC Client 1 140; and (b) at step 706, instead of the transaction report information being communicated to the AO device 160 and displayed thereon, the transaction report information may be received from the MPC Client 1 140 by the API endpoint and then communicated (in one or more data messages) to the AO API device. In some such embodiments, this API may be implemented using HTTP (i.e., the data messages communicated between the AO API device and API endpoint may be HTTP messages) and/or the information communicated between the AO API device and API endpoint may be formatted in JSON, YAML, XML, or some other format.

In some instances, the source address for the transaction generated in the method of FIG. 7 is a public blockchain address that is (a) generated using the wallet creation process/custody address creation process of FIG. 6, or (b) based on (e.g., derived from) private key shares, a public address, and/or other data generated using the wallet creation process/custody address creation process of FIG. 6.

Although the process shown in FIG. 7 relates to MPC Node Cluster 1 250, MPC Node Cluster 1 250 is used as an example, and the process shown in FIG. 7 and described above may be performed, mutatis mutandis, for each of the MPC node clusters deployed in the digital asset custody system 100.

8. Description of FIG. 8—Example Computing System

FIG. 8 shows an example computing system that may be used in some embodiments to implement features described herein. An example computing device 800 (which may also be referred to, for example, as a "computing device," "computer system," or "computing system") includes one or more of the following: one or more hardware processors 802; one or more memory devices 804; one or more network interface devices 806; one or more display interfaces 808; and one or more user input adapters 810. Additionally, in some embodiments, the computing device 800 is connected to or includes a display device 812. As will explained below, these elements (e.g., the hardware processors 802, memory devices 804, network interface devices 806, display interfaces 808, user input adapters 810, display device 812) are hardware devices (for example, electronic circuits or combinations of circuits) that are configured to perform various functions for the computing device 800.

In some embodiments, each or any of the hardware processors 802 is or includes, for example, a single-core or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 802 uses an instruction set architecture such as x86 or Advanced RISC Machine (Arm).

In some embodiments, each or any of the memory devices 804 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 802). Memory devices 804 are examples of non-volatile computer-readable storage media.

In some embodiments, each or any of the network interface devices 806 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 808 is or includes one or more circuits that receive data from the hardware processors 802, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 812, which displays the image data. Alternatively or additionally, in some embodiments, each or any of the display interfaces 808 is or includes, for example, a video card, video adapter, or graphics processing unit (GPU).

In some embodiments, each or any of the user input adapters 810 is or includes one or more circuits that receive and process user input data from one or more user input devices (not shown in FIG. 8) that are included in, attached to, or otherwise in communication with the computing device 800, and that output data based on the received input data to the hardware processors 802. Alternatively or additionally, in some embodiments each or any of the user input adapters 810 is or includes, for example, a PS/2 interface, a USB interface, a touchscreen controller, or the like; and/or the user input adapters 810 facilitates input from user input devices (not shown in FIG. 8) such as, for example, a keyboard, mouse, trackpad, touchscreen, etc.

In some embodiments, the display device 812 may be a Liquid Crystal Display (LCD) display, Light Emitting Diode (LED) display, or other type of display device. In embodiments where the display device 812 is a component of the computing device 800 (e.g., the computing device and the display device are included in a unified housing), the display device 812 may be a touchscreen display or non-touchscreen display. In embodiments where the display device is connected to the computing device 800 (e.g., is external to the computing device 800 and communicates with the computing device 800 via a wire and/or via wireless communication technology), the display device 812 is, for example, an external monitor, projector, television, display screen, etc.

In various embodiments, the computing device 800 includes one, or two, or three, four, or more of each or any of the above-mentioned elements (e.g., the hardware processors 802, memory devices 804, network interface devices 806, display interfaces 808, and user input adapters 810). Alternatively or additionally, in some embodiments, the computing device 800 includes one or more of: a processing system that includes the hardware processors 802; a memory or storage system that includes the memory devices 804; and a network interface system that includes the network interface devices 806.

The computing device 800 may be arranged, in various embodiments, in many different ways. In various embodiments, the computing device 800 includes one, or two, or three, four, or more of each or any of the above-mentioned elements (e.g., the processors 802, memory devices 804, network interface devices 806, display interfaces 808, and user input adapters 810). Alternatively, or additionally, in some embodiments, the computing device 800 includes one or more of: a processing system that includes the processors 802; a memory or storage system that includes the memory devices 804; and a network interface system that includes the network interface devices 806. Alternatively, or additionally, in some embodiments, the computing device 800 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 802 and the network interface devices 806; or the single SoC (or the multiple SoCs) may include the processors 802, the network interface devices 806, and the memory devices 804; and so on. Further, the computing device 800 may be arranged in some embodiments such that: the processors 802 include a multi- (or single)-core processor; the network interface devices 806 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 804 include a RAM and a flash memory. As another example, the computing device 800 may be arranged in some embodiments such that: the processors 802 include two, three, four, five, or more multi-core processors; the network interface devices 806 include a first network interface device that implements Ethernet and a second network interface device that implements WiFi and/or Bluetooth; and the memory devices 804 include a RAM and a flash memory or hard disk.

As previously noted, whenever it is described in this document that a software-based node, module, or process performs an action, operation, or function, the action, operation, or function is in actuality performed by underlying hardware elements according to the instructions used to implement the node, module, or process. Consistent with the foregoing, in various embodiments, each or any combination of the MPC nodes 110, 111, 112, 120, 121, 122, 130, 131, 132, MPC clients 140-142, configuration approval portals 174, 184, 194, MPC Controller 146, initializers 46a-46c, node operators 114-45c, blockchain service 147, and frontend modules 162, 172-172, 164, each of which will be referred to individually for clarity as a "component" for the remainder of this paragraph, are implemented using an example of the computing device 800 of FIG. 8. In such embodiments, the following applies for each component: (a) the elements of the 800 computing device 800 shown in FIG. 8 (i.e., the one or more hardware processors 802, one or more memory devices 804, one or more network interface devices 806, one or more display interfaces 808, and one or more user input adapters 810), or appropriate combinations or subsets of the foregoing) are configured to, adapted to, and/or programmed to implement each or any combination of the actions, activities, or features described herein as performed by the component and/or by any software nodes, processes, or modules described herein as included within the component; (b) alternatively or additionally, to the extent it is described herein that one or more software nodes, processes, or modules exist within the component, in some embodiments, such software nodes, processes, or modules (as well as any data described herein as handled and/or used by the software nodes, processes, or modules) are stored in the memory devices 804 (e.g., in various embodiments, in a volatile memory device such as a RAM or an instruction register and/or in a non-volatile memory device such as a flash memory or hard disk) and all actions described herein as performed by the software nodes, processes, or modules are performed by the processors 802 in conjunction with, as appropriate, the other elements in and/or connected to the computing device 800 (i.e., the network interface devices 806, display interfaces 808, user input adapters 810, and/or display device 812); (c) alternatively or additionally, to the extent it is described herein that the component processes and/or otherwise handles data, in some embodiments, such data is stored in the memory devices 804 (e.g., in some embodiments, in a volatile memory device such as a RAM and/or in a non-volatile memory device such as a flash memory or hard disk) and/or is processed/handled by the processors 802 in conjunction, as appropriate, the other elements in and/or connected to the computing device 800 (i.e., the network interface devices 806, display interfaces 808, user input adapters 810, and/or display device 812); (d) alternatively or additionally, in some embodiments, the memory devices 802 store instructions that, when executed by the processors 802, cause the processors 802 to perform, in conjunction with, as appropriate, the other elements in and/or connected to the computing device 800 (i.e., the memory devices 804, network interface devices 806, display interfaces 808, user input adapters 810, and/or display device 812), each or any combination of actions described herein as performed by the component and/or by any software nodes, processes, or modules described herein as included within the component.

Consistent with the techniques described herein, as one example, in an embodiment where an instance of the computing device 800 is used to implement the digital asset custody system 100, the memory devices 804 could load program instructions for the functionality of the modules, operations, and/or function blocks described above.

The hardware configurations shown in FIG. 8 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 8, (e) via other hardware arrangements, architectures, and configurations, and/or via combinations of the technology described in (a) through (e).

9. Technical Advantages of Described Subject Matter

The following paragraphs describe technical advantages that may be realized in accordance with various embodiments discussed herein.

In some embodiments, the digital asset custody system includes an MPC controller, along with MPC node initializers and MPC node operators, with the MPC node initializers and MPC node operators operating across different computing environments, with the MPC controller and initializers/operators configured to deploy new MPC node clusters, such that, for each new deployed MPC node cluster, each MPC node in the cluster is deployed into a respective different one of the computing environments. This digital asset custody system architecture, along with separable aspects/features thereof, addresses a number of technical problems and embodies a number of technical advantages, including but not limited to with respect to information security and scalability, as will be described below.

One technical challenge present in the context of digital asset custody systems is information security; e.g., how to protect against unauthorized access to/the theft of secrets and other valuable information.

In some embodiments, the digital asset custody system includes MPC nodes in an MPC cluster, where each node in the cluster operates in a separate computing environment. Having the nodes deployed and operating in separate computing environments contributes to information security, because even if an attacker can compromise one of the computing environments, the attacker would need to separately compromise all the other computing environments in order to obtain all necessary information.

In some embodiments, in the digital asset custody system, each of the separate computing environments is associated with a respective different signing party. Having the environments associated with the different signing parties further contributes to information security, because having multiple distinct/separate signing parties that operate independently from each other means that an attacker would need to compromise multiple signing parties, not just one. The separation of signing parties is an additional layer of information security from the security provided by the nodes being deployed and operating in separate computing environments.

In some embodiments, different private key shares are generated and stored by the MPC nodes in an MPC cluster, with each MPC node in an MPC cluster storing a private key share for the associated asset owner that is different from other private key shares stored by other MPC nodes in that MPC cluster; additionally, each cluster of MPC nodes may be associated with a different asset owner. Because MPC protocols and private key shares are used (versus a stored private key), this approach contributes to information security with respect to the digital assets custodied by the digital asset custody system, by removing the single private key as a single point of failure. Additionally, this level of physical separation of private key shares across different computing environments further protects against a single point of failure; because different private key shares are held/used in separate computing environments, there is not a single point of failure with respect to the computing environments. And even further, because the computing environments (and private key shares used therein) are associated with different signing parties, no one signing party (on its own) can validly sign a blockchain transaction for an asset owner. And even further, because each MPC cluster is associated with (and manages information such as private key shares) with respect to a respective different asset owner, compromise of a single MPC cluster, if it occurs, may in some embodiments only relate to a single asset owner, not multiple asset owners. These aspects of the digital asset custody system in some embodiments, separately and collectively, may make it more challenging for an attacker to take control of digital assets custodied by the digital asset custody system, and thus contribute to information security.

In some embodiments, as described herein, configuration information is generated that includes secrets (e.g., private keys), but then identifiers (instead of the secrets themselves) are used when the configuration information is communicated between components and/or reviewed by signing parties via the configuration approval portals. One example of this is when a node initializer (operating in conjunction with a secrets manager) generates initial configuration information for an MPC node that includes one or more identifiers (at e.g. step 302 in FIG. 3A), and the identifier(s) is/are included in deployment configuration information which is reviewed by a signing party (at e.g. step 312 in FIG. 3B), and then the identifier(s) is/are used to retrieve the original secrets to deploy the MPC node (e.g. at step 314/316/318 in FIG. 3B) and used by the MPC node thereafter to operate. The use of identifiers in this manner allows for configuration information to be communicated, without requiring that the secrets themselves be communicated, which could lead to the secrets being compromised; thus, the use of identifiers in this manner contributes to information security. Additionally, the use of identifiers in this manner allows for configuration information to be reviewed by signing party users, without requiring that the secrets themselves be reviewed by the signing party users, which could also lead to the secrets being compromised; thus, the use of identifiers in this manner additionally contributes to information security.

In some embodiments, node keys are specifically configured for the components in an MPC cluster, to facilitate secure communications between the components (e.g., MPC nodes and an MPC client) in that cluster. Because only the components in the MPC cluster have the necessary node keys, other components in the digital asset custody system (e.g., components from other clusters) are not able to participate in the secure communications based on the use of the node keys. Thus, security is provided for each MPC cluster, the information it handles, and any communications with the MPC cluster. These communication and access boundaries contribute to information security.

Another technical problem with digital asset custody systems is that their capacity and configuration, once established, are set, static, and/or difficult to modify. On the other hand, the architecture of the digital asset custody system described herein with respect to some embodiments is scalable. In some embodiments, the described digital asset custody system includes an MPC controller, along with MPC node initializers and MPC node operators (which operate across different computing environments); and the MPC controller and initializers/operators are able to able to dynamically and/or as needed generate the configuration information to deploy a new MPC node cluster across the different computing environments, with each node in a given cluster being deployed into one of the different computing environments. This architecture allows for new MPC clusters to be added to the digital asset custody system as may be needed, thus efficiently scaling the digital asset custody system. This enables the addition of new AOs and/or wallets to the digital asset custody system. This is in contrast to a static digital asset custody system with pre-allocated capacity of system resources. It is possible with this scalable architecture of the described digital asset custody system to scale to hundreds of thousands, if not millions, of wallets. (Additionally, this architecture of the digital asset custody system is scalable as noted above while also contributing to information security as noted in the above preceding paragraphs; this architecture of the digital asset custody system in some embodiments is not only scalable, but is scalable while also contributing to information security.)

Another technical problem with digital asset custody systems is that many systems, when they have scaled to handle very large numbers of wallets, use significant computing resources. In some embodiments, the digital asset custody system may include an MPC cluster (which may include MPC nodes and an MPC client), with each MPC cluster being responsible for the wallet(s) (and/or custody addresses) for an asset owner. Additionally, in some embodiments, MPC nodes may be implemented as containers; containers in many implementations require less computing resources than other approaches, and thus implementing MPC nodes as containers, as described in some embodiments, may additionally contribute to the efficient use of computing resources.

Further, other technical problems may be addressed by, and/or other technical advantages may be embodied in, the subject matter described herein.

10. Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

11. Additional Applications of Described Subject Matter

While it is described herein that an MPC cluster in the digital asset custody system 100 may include three MPC nodes, it should be understood that three is just an example number of MPC nodes that may be included in a cluster, and that in various embodiments a different number of nodes (e.g., two, or four, or five, or six, or more) may be employed; in some such embodiments, the architecture of the digital asset custody system 100 may include less/additional signing party environments (to maintain the 1:1 ratio between MPC nodes and signing party environments), and the processes described herein (e.g., the processes of FIGS. 3A-3B, FIG. 6, and/or FIG. 7) may operate essentially as shown/described herein, differing to involve the different number of nodes.

The subject matter described herein may be applied in different domains, in addition to the domain of digital assets. For example, the subject matter described herein may be applied in any domain that requires secure custody and/or secure access of digital information and/or objects.

Although process steps, algorithms or the like, including without limitation with reference to FIGS. 1-8, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:
1. A system comprising:
one or more hardware processors;
one or more memories in communication with the one or more hardware processors;
wherein:
the one or more hardware processors and the one or more memories are configured to implement a multi-party computation (MPC) controller, a plurality of MPC node initializers, and a plurality of MPC node operators, wherein:
each of the MPC node initializers is configured to operate in a respective different computing environment of a plurality of computing environments, and each of the plurality of computing environments is associated with a respective different signing party of a plurality of signing parties;
each of the MPC node operators is configured to operate in a respective different computing environment of the plurality of computing environments, such that each of the plurality of computing environments comprises one of the MPC node initializers and one of the MPC node operators;
the MPC controller and MPC node initializers are configured to perform operations to generate first configuration information for each MPC node in a first MPC cluster of MPC nodes, wherein the number of MPC nodes in the first MPC cluster corresponds to the number of computing environments;
each of the MPC node operators is configured, based on the first configuration information, to deploy one of the MPC nodes in the first MPC cluster in the computing environment corresponding to where the MPC node operator is configured to operate, such that each MPC node of the first MPC cluster is deployed into a respective one of the plurality of computing environments;
the MPC controller and MPC node initializers are further configured to perform operations to generate second configuration information for each MPC node in a second MPC cluster of MPC nodes, wherein the number of MPC nodes in the second MPC cluster corresponds to the number of computing environments; and
each of the MPC node operators is further configured, based on the second configuration information, to deploy one of the MPC nodes in the second MPC cluster in the computing environment in which the MPC node operator is configured to operate, such that each MPC node of the second MPC cluster is deployed into a respective one of the plurality of computing environments.

2. The system in claim 1, wherein:
the MPC controller is configured to perform operations that include:
communicating the first configuration information to a plurality of configuration approval portals, wherein each of the plurality of configuration approval portals is associated with a respective different computing environment of the plurality of computing environments; and
communicating the second configuration information to the plurality of configuration approval portals; and
each of the MPC node operators is further configured to perform operations that include:
determining that the first configuration information for its respective MPC node of the first MPC cluster was approved via the associated configuration approval portal;
in response to determining that the first configuration information was approved, deploying its respective MPC node in the first MPC cluster in its respective computing environment;

determining that that the second configuration information for its respective MPC node in the second MPC cluster was approved via the configuration approval portal; and in response to determining that that the second configuration information was approved, deploying the one MPC node in the second MPC cluster in its respective computing environment.

3. The system in claim 1, wherein:

the MPC nodes in the first MPC cluster are configured with respective first node keys for authenticated communication with the other MPC nodes in the first MPC cluster;

the first MPC cluster is associated with a first asset owner;

each MPC node of the first MPC cluster is configured to perform operations that include:

generating and storing a respective private key share for the first asset owner; and signing a digital asset transaction for the first asset owner in its respective computing environment using its respective private key share;

the MPC nodes in the second MPC cluster are configured with respective second node keys for authenticated communication with the other MPC nodes in the second MPC cluster;

the second MPC cluster is associated with a second asset owner;

each MPC node of the second MPC cluster is configured to perform operations that include:

generating and storing a respective private key share for the second asset owner; and signing a digital asset transaction for the second asset owner in its respective computing environment using its respective private key share.

4. The system in claim 1, wherein:

the MPC controller is further configured to perform operations that include:

communicating with the MPC node initializers to generate third configuration information for a third MPC cluster of MPC nodes; and communicating the third configuration information to a plurality of configuration approval portals, the MPC controller and MPC node initializers are further configured to perform operations to generate third configuration information for each MPC node in a third MPC cluster of MPC nodes, wherein the number of MPC nodes in the third MPC cluster corresponds to the number of computing environments;

each of the MPC node operators is configured to perform operations that include:

determining that the third configuration information for its respective MPC node of the third MPC cluster was approved via the associated configuration approval portal; and in response to determining that the third configuration information was approved, deploying its respective MPC node of the third MPC cluster in its respective computing environment.

5. The system in claim 1, wherein:

the one or more hardware processors and one or more memories are further configured to implement:

a plurality of MPC node secrets managers, wherein each of the MPC node secrets managers is configured to operate in a respective different computing environment of the plurality of computing environments, such that each of the plurality of computing environments comprises one of the plurality of MPC node secrets managers;

the operations that the MPC controller and MPC node initializers are configured to perform to generate the configuration information for each MPC node of an MPC cluster of MPC nodes include, for each of the MPC nodes in the cluster:

the MPC controller generating a request for a configuration for the MPC node;

the MPC controller communicating the request for the configuration for the MPC node to a corresponding MPC node initializer of the plurality of node initializers;

the MPC node initializer generating, in response to receiving the request, information that includes:

one or more secrets, wherein the one or more secrets include a node private key to use in secure communications with other components in the first MPC cluster; and one or more non-secrets, wherein the one or more non-secrets include a node public key to use in secure communications with other components in the first MPC cluster;

the MPC node initializer providing to the MPC node secrets manager in its computing environment the one or more secrets from the generated information, wherein the MPC node secrets manager is configured to store the one or more secrets and return to the MPC node initializer one or more corresponding secret identifiers;

the MPC node initializer generating MPC node initial configuration information that includes the one or more non-secrets and the one or more secret identifiers; and the MPC node initializer transmitting the MPC node initial configuration information to the MPC controller.

6. The system in claim 5, wherein the MPC node initial configuration information for each MPC node in the first MPC cluster includes:

a name space corresponding to an asset owner associated with the first MPC cluster;

a node label for the MPC node and a node label for one or more other MPC nodes of the first MPC cluster;

an address for the one or more other MPC nodes of the first MPC cluster; and a public key for the one or more other MPC nodes of the first MPC cluster.

7. The system in claim 5, wherein:

the MPC controller is further configured to perform operations that include:

receiving the MPC node initial configuration information for each of the MPC nodes in the first MPC cluster; and for each of the MPC nodes in the first MPC cluster, generating deployment configuration information for the MPC node based on the MPC node initial configuration information for the other MPC nodes in the first MPC cluster.

8. The system in claim 7, wherein:

each MPC node operator in each computing environment is configured to perform operations that include:

receiving the deployment configuration information for the MPC node in its corresponding computing environment;

providing to the secrets manager in its computing environment one or more of the secret identifiers from the deployment configuration information;

receiving from the secrets manager in its computing environment the one or more secrets that correspond to the one or more secret identifiers; and deploying the MPC node in its computing environment, such that, after deployment, the MPC node is configured to operate based on (a) the one or more secrets received from the secrets manager and (b) non-secret information from the deployment configuration information for the MPC node.

9. The system in claim 7, wherein:

the one or more hardware processors and one or more memories are further configured to implement an MPC client associated with each MPC cluster;

the MPC controller is configured to perform operations to generate MPC client initial configuration information for the MPC client, the MPC client initial configuration information including:

one or more secret identifiers, wherein the one or more secret identifiers include an MPC client private key identifier that corresponds to an MPC client private key for the MPC client to use in secure communications with other components in the first MPC cluster; and one or more non-secrets, wherein the one or more non-secrets include an MPC client public key for the MPC to use in secure communications with other components in the first MPC cluster; and the MPC controller is configured to generate deployment configuration information for the MPC client based on the MPC client initial configuration information.

10. The system in claim 9, wherein:

the one or more hardware processors and one or more memories are further configured to implement an MPC client secrets manager;

the operations that the MPC controller is configured to perform to generate MPC client initial configuration information for the MPC client include:

providing the MPC client private key to the MPC client secrets manager, wherein the MPC client secrets manager is configured to store the MPC client private key and return a corresponding MPC client private key identifier; and receiving the MPC client private key identifier from the MPC client secrets manager.

11. The system in claim 10, wherein the MPC controller is further configured to perform operations that include:

communicating the deployment configuration information for the MPC client to a configuration approval portal;

determining that the deployment configuration information for the MPC client was approved via the configuration approval portal; and in response to determining that the deployment configuration information for the MPC client was approved, deploying the MPC client.

12. The system in claim 11, wherein the MPC controller is further configured to perform operations that include, after the determining that the deployment configuration information for the MPC client was approved via the configuration approval portal:

providing to the MPC client secrets manager the MPC client private key identifier; and receiving, from the MPC client secrets manager in response to the MPC client private key identifier, the MPC client private key;

wherein the deploying the MPC client by the MPC controller includes using the MPC client private key and one or more non-secrets from the deployment configuration information for the MPC client.

13. The system in claim 12, wherein:

the MPC controller is configured to generate configuration information for the MPC client that includes:

an MPC node public key for each MPC node in the first MPC cluster; and an address for each MPC node in the first MPC cluster; and the MPC client is configured to securely communicate with each MPC node in the first MPC cluster using the MPC node public key and the address for each MPC node in the first MPC cluster.

14. The system in claim 1, wherein:

the one or more hardware processors and one or more memories are further configured to implement an MPC client associated with each MPC cluster;

each MPC client is configured to communicate with each MPC node in its respective MPC cluster, using one or more MPC protocols, to generate a public blockchain address for the corresponding asset owner; and each MPC client is configured to send the public blockchain address to a computing device associated with its corresponding asset owner.

15. The system in claim 14, wherein:

the one or more hardware processors and one or more memories are further configured to implement a blockchain service;

the MPC client is configured to send a blockchain transaction to each MPC node in its respective MPC cluster for partial signature;

each MPC node in the first MPC cluster is configured to generate a partial signature for the blockchain transaction using a private key share, and to send the partial signature to its respective MPC client;

the MPC client is configured to generate a full signature using the partial signatures received from each MPC node in its respective MPC cluster, add the full signature to the blockchain transaction to generate a fully-signed blockchain transaction, and provide the fully-signed blockchain transaction to the blockchain service; and the blockchain service is configured to transmit the full-signed blockchain service to a blockchain network.

16. The system in claim 1, wherein each of the plurality of computing environments corresponds to a private network.

17. The system in claim 1, wherein each MPC node in an cluster of MPC nodes is configured in its respective computing environment as a container that operates on a container host, and wherein the container host operates on a virtual machine or an operating system.

18. A method, comprising:

in a computing system that includes one or more hardware processors and one or more memories, wherein the one or more memories are configured to store instructions for a multi-party computation (MPC) controller, a plurality of MPC node initializers, and a plurality of MPC node operators:

operating each of the MPC node initializers in a respective different computing environment of a plurality of computing environments, where each of the plurality of computing environments is associated with a respective different signing party of a plurality of signing parties;

operating each of the MPC node operators in a respective different computing environment of the plurality of computing environments, such that, each of the plurality of computing environments comprises one of the MPC node initializers and one of the MPC node operators;

the MPC controller and MPC node initializers generating first configuration information for each MPC node in a first MPC cluster of MPC nodes, wherein the number of MPC nodes in the first MPC cluster corresponds to the number of computing environments;

each of the MPC node operators, based on the first configuration information, deploying one of the MPC nodes in the first MPC cluster in its respective computing environment, such that the one MPC node in the first MPC cluster is deployed into a respective one of the plurality of computing environments;

the MPC controller and MPC node initializers generating second configuration information for each MPC node of a second MPC cluster of MPC nodes, wherein the number of MPC nodes in the second MPC cluster corresponds to the number of computing environments; and each of the MPC node operators, based on the second configuration information, deploying one of the MPC nodes of the second MPC cluster in its respective computing environment in which the MPC node operator is configured to operate, such that the one MPC node of the second MPC cluster is deployed into a respective one of the plurality of computing environments.

19. The method in claim 18, further comprising:
the MPC controller:
communicating the first configuration information to a plurality of configuration approval portals, wherein each of the plurality of configuration approval portals is associated with a respective different computing environment of the plurality of computing environments, and communicating the second configuration information to the plurality of configuration approval portals; and each of the MPC node operators:
determining that the first configuration information for its respective MPC node of the first MPC cluster was approved via the associated configuration approval portal;

in response to determining that the first configuration information was approved, deploying its respective MPC node in the first MPC cluster in its respective computing environment;

determining that that the second configuration information for its respective MPC node in the second MPC cluster was approved via the configuration approval portal; and in response to determining that that the second configuration information was approved, deploying the one MPC node in the second MPC cluster in its respective computing environment.

20. A non-transitory, computer-readable storage medium having instructions stored thereon for a multi-party computation (MPC) controller, a plurality of MPC node initializers, and a plurality of MPC node operators, and which when executed by one or more hardware processors cause the one or more hardware processors to perform operations comprising:

operating each of the MPC node initializers in a respective different computing environment of a plurality of computing environments, where each of the plurality of computing environments is associated with a respective different signing party of a plurality of signing parties;

operating each of the MPC node operators in a respective different computing environment of the plurality of computing environments, such that each of the plurality of computing environments comprises one of the MPC node initializers and one of the MPC node operators;

the MPC controller and MPC node initializers generating first configuration information for each MPC node in a first MPC cluster of MPC nodes, wherein the number of MPC nodes in the first MPC cluster corresponds to the number of computing environments;

each of the MPC node operators, based on the first configuration information, deploying one of the MPC nodes of the first MPC cluster in its respective computing environment, such that each MPC node of the first MPC cluster is deployed into a respective one of the plurality of computing environments;

the MPC controller and MPC node initializers generating second configuration information for each MPC node in a second MPC cluster of MPC nodes, wherein the number of MPC nodes in the second MPC cluster corresponds to the number of computing environments; and each of the MPC node operators, based on the second configuration information, deploying one of the MPC nodes of the second MPC cluster in its respective computing environment, such that each MPC node of the second MPC cluster is deployed into a respective one of the plurality of computing environments.

* * * * *